United States Patent
Chuang et al.

(10) Patent No.: US 9,749,526 B2
(45) Date of Patent: Aug. 29, 2017

(54) IMAGING SYSTEM FOR IMMERSIVE SURVEILLANCE

(71) Applicants: Daniel B. Chuang, Cambridge, MA (US); Lawrence M. Candell, Arlington, MA (US); William D. Ross, Westford, MA (US); Mark E. Beattie, Westford, MA (US); Cindy Y. Fang, Arlington, MA (US); Bobby Ren, Cambridge, MA (US); Jonathan P. Blanchard, Sterling, MA (US)

(72) Inventors: Daniel B. Chuang, Cambridge, MA (US); Lawrence M. Candell, Arlington, MA (US); William D. Ross, Westford, MA (US); Mark E. Beattie, Westford, MA (US); Cindy Y. Fang, Arlington, MA (US); Bobby Ren, Cambridge, MA (US); Jonathan P. Blanchard, Sterling, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 9 days.

(21) Appl. No.: 14/692,482

(22) Filed: Apr. 21, 2015

(65) Prior Publication Data
US 2016/0014335 A1    Jan. 14, 2016

Related U.S. Application Data

(63) Continuation of application No. 13/438,693, filed as application No. PCT/US2010/060822 on Dec. 16, 2010, now Pat. No. 9,036,001.

(51) Int. Cl.
*H04N 5/232* (2006.01)
*H04N 7/18* (2006.01)
(Continued)

(52) U.S. Cl.
CPC ... *H04N 5/23238* (2013.01); *G08B 13/19602* (2013.01); *G08B 13/19619* (2013.01);
(Continued)

(58) Field of Classification Search
CPC ............... H04N 5/23238; H04N 7/181; H04N 5/23216; G08B 13/19602; G08B 13/19619; G08B 13/19626
(Continued)

(56) References Cited

U.S. PATENT DOCUMENTS 5,023,725 A   6/1991   McCutchen
5,067,019 A   11/1991  Juday et al.
(Continued)

OTHER PUBLICATIONS

Immersive Media, "Dodeca 2360 Camera System", www.immersivemedia.com; 2011 Immersive Media Corp.
(Continued)

*Primary Examiner* — Hee-Yong Kim
(74) *Attorney, Agent, or Firm* — Cooley LLP

(57) ABSTRACT

Security guards at big facilities, such as airports, monitor multiple screens that display images from individual surveillance cameras dispersed throughout the facility. If a guard zooms with a particular camera, he will lose image resolution, along with perspective on the surrounding area. Embodiments of the inventive Imaging System for Immersive Surveillance (ISIS) solve these problems by combining multiple cameras in one device. When properly mounted, example ISIS systems offer 360-degree, 100-megapixel views on a single screen. (Other resolutions may also be employed.) Image-stitching software merges multiple video feeds into one scene. The system also allows operators to tag and follow targets, and can monitor restricted areas and sound an alert when intruders breach them.

13 Claims, 16 Drawing Sheets

(51) Int. Cl.
  *G09C 5/00* (2006.01)
  *G01R 31/26* (2014.01)
  *H04N 7/14* (2006.01)
  *G03B 13/00* (2006.01)
  *G08B 13/196* (2006.01)

(52) U.S. Cl.
  CPC . *G08B 13/19626* (2013.01); *G08B 13/19643* (2013.01); *H04N 5/23216* (2013.01); *H04N 7/181* (2013.01)

(58) Field of Classification Search
  USPC .......................................................... 348/36
  See application file for complete search history.

(56) References Cited

U.S. PATENT DOCUMENTS

| | | | |
|---|---|---|---|
| 5,068,735 A | 11/1991 | Tuchiya et al. | |
| 5,691,765 A | 11/1997 | Schieltz et al. | |
| 5,764,276 A | 6/1998 | Martin et al. | |
| 5,877,801 A | 3/1999 | Martin et al. | |
| 5,903,319 A | 5/1999 | Busko et al. | |
| 5,990,941 A | 11/1999 | Jackson et al. | |
| 6,002,430 A | 12/1999 | McCall et al. | |
| 6,141,034 A | 10/2000 | McCutchen | |
| 6,147,709 A | 11/2000 | Martin et al. | |
| 6,201,574 B1 | 3/2001 | Martin | |
| 6,243,131 B1 | 6/2001 | Martin | |
| 6,256,061 B1 | 7/2001 | Martin et al. | |
| 6,301,447 B1 | 10/2001 | Jackson et al. | |
| 6,782,294 B2 | 8/2004 | Reich et al. | |
| 6,795,113 B1 | 9/2004 | Jackson et al. | |
| 6,895,557 B1 | 5/2005 | Wood et al. | |
| 6,947,059 B2 | 9/2005 | Pierce et al. | |
| 7,009,645 B1 | 3/2006 | Sandini et al. | |
| 7,015,949 B1 | 3/2006 | Sah | |
| 7,023,913 B1 | 4/2006 | Monroe | |
| 7,024,488 B1 | 4/2006 | Sah | |
| 7,076,085 B1 | 7/2006 | Sah | |
| 7,119,961 B2 | 10/2006 | Yoshikawa et al. | |
| 7,148,914 B2 | 12/2006 | Bronson | |
| 7,177,448 B1 | 2/2007 | Sah | |
| 7,312,820 B2 | 12/2007 | Zimmermann et al. | |
| 7,388,982 B2 | 6/2008 | Endo et al. | |
| 7,492,390 B2 | 2/2009 | Kaplinsky | |
| 7,492,391 B1 | 2/2009 | Kaplinsky | |
| 7,532,975 B2 | 5/2009 | Ishikawa | |
| 7,543,327 B1 | 6/2009 | Kaplinsky | |
| 7,548,258 B2 | 6/2009 | Kaplinsky | |
| 7,599,550 B1 | 10/2009 | Kaplinsky | |
| 7,623,152 B1 | 11/2009 | Kaplinsky | |
| 7,680,192 B2 | 3/2010 | Kaplinsky | |
| 7,750,936 B2 | 7/2010 | Provinsal et al. | |
| 7,865,013 B2 | 1/2011 | Hack | |
| 7,903,871 B2 | 3/2011 | Kaplinsky et al. | |
| 8,013,899 B2 | 9/2011 | Gillard et al. | |
| 8,400,555 B1* | 3/2013 | Georgiev | H04N 5/23212 348/222.1 |
| 2002/0075201 A1* | 6/2002 | Sauer | A61B 34/20 345/7 |
| 2003/0026588 A1 | 2/2003 | Elder et al. | |
| 2003/0035478 A1* | 2/2003 | Taubman | G06T 9/00 375/240.11 |
| 2005/0025313 A1* | 2/2005 | Wachtel | G06T 1/0007 380/54 |
| 2005/0071047 A1 | 3/2005 | Okabayashi et al. | |
| 2005/0122397 A1* | 6/2005 | Henson | G06K 9/00771 348/143 |
| 2006/0028550 A1 | 2/2006 | Palmer et al. | |
| 2006/0033813 A1 | 2/2006 | Provinsal et al. | |
| 2006/0069189 A1 | 3/2006 | Yang et al. | |
| 2006/0125921 A1 | 6/2006 | Foote | |
| 2007/0070190 A1 | 3/2007 | Yin et al. | |
| 2007/0109407 A1 | 5/2007 | Thompson | |
| 2007/0132836 A1* | 6/2007 | Katz | G06Q 20/208 348/14.01 |
| 2007/0182819 A1 | 8/2007 | Monroe | |
| 2007/0188653 A1 | 8/2007 | Pollock et al. | |
| 2008/0143842 A1 | 6/2008 | Gillard et al. | |
| 2008/0170140 A1 | 7/2008 | Silver et al. | |
| 2008/0192116 A1 | 8/2008 | Tamir et al. | |
| 2009/0058988 A1 | 3/2009 | Strzempko et al. | |
| 2009/0122175 A1 | 5/2009 | Yamagata | |
| 2009/0295924 A1 | 12/2009 | Peters et al. | |
| 2009/0317020 A1 | 12/2009 | Gerhard et al. | |
| 2010/0026822 A1 | 2/2010 | Hahm et al. | |
| 2010/0040297 A1 | 2/2010 | Ohba et al. | |
| 2010/0045773 A1 | 2/2010 | Ritchey | |
| 2010/0129000 A1 | 5/2010 | Strom | |
| 2010/0165134 A1 | 7/2010 | Dowski et al. | |
| 2010/0321471 A1 | 12/2010 | Casolara | |
| 2011/0050929 A1 | 3/2011 | Lee et al. | |
| 2011/0069148 A1 | 3/2011 | Jones et al. | |
| 2011/0069189 A1 | 3/2011 | Venkataraman et al. | |
| 2011/0128393 A1 | 6/2011 | Tavi et al. | |
| 2012/0169842 A1 | 7/2012 | Chuang et al. | |

OTHER PUBLICATIONS

International Search Report and Written Opinion issued in PCT/US2010/060822 dated Jan. 10, 2012.
International Preliminary Report on Patentability issued in PCT/US2010/060822 dated Jun. 18, 2013, 7 pages.
Notice of Allowance in U.S. Appl. No. 13/327,416, filed Dec. 15, 2011, mailed Dec. 3, 2014, 18 pages.
Office Action in U.S. Appl. No. 13/327,416, mailed Aug. 26, 2014, 15 pages.
Restriction Requirement in U.S. Appl. No. 13/327,416, mailed Jul. 29, 2014, 6 pages.

* cited by examiner

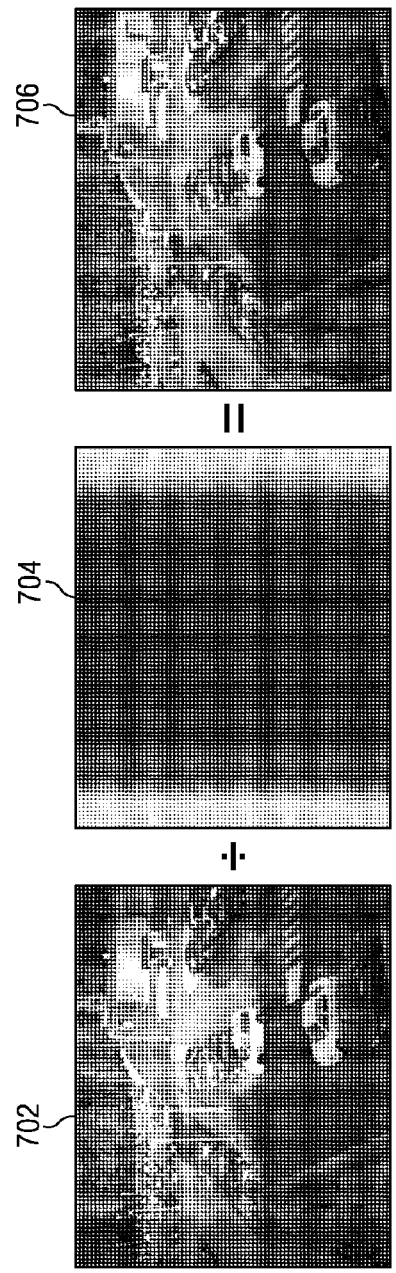
FIG. 7
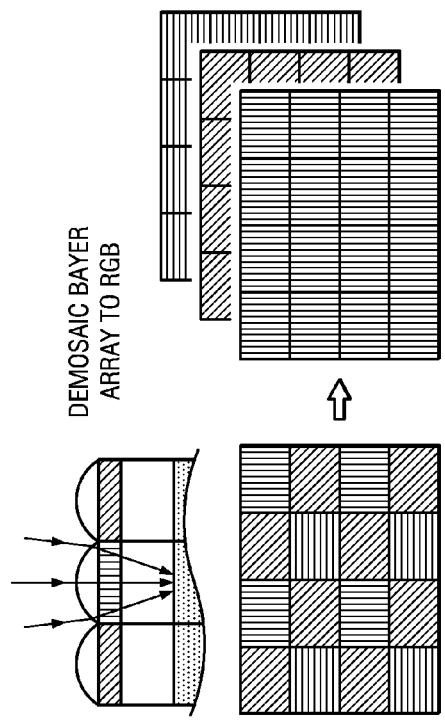
FIG. 8

IMAGING SYSTEM FOR IMMERSIVE SURVEILLANCE

CROSS-REFERENCE TO RELATED APPLICATIONS

This application claims priority, under 35 U.S.C. §120, as a continuation of U.S. non-provisional patent application Ser. No. 13/438,693, filed Apr. 3, 2012, and entitled "Imaging Systems for Immersive Surveillance," which application is incorporated herein by reference in its entirety. Ser. No. 13/438,693 in turn claims priority to PCT/US2010/060822, filed Dec. 16, 2010, and entitled "Imaging System for Immersive Surveillance," which application is incorporated herein by reference in its entirety.

GOVERNMENT SUPPORT

This invention was made with Government support under Contract No. FA8721-05-C-0002 awarded by the U.S. Air Force. The Government has certain rights in the invention.

BACKGROUND

Conventional surveillance systems generally use cameras with individual pan/tilt/zoom mechanisms, meaning that they either provide a wide field of view at low resolution, which makes it difficult or impossible to identify individuals, or a narrow field of view at high resolution, which means that situational awareness outside the field of view is lost. Worse, the spatial resolution of images acquired by conventional surveillance systems varies with the distance to the target and the particular optical arrangement of the cameras. Thus, not all imagery collected by conventional surveillance systems is suitable for target tracking, pattern (face) recognition, etc.

SUMMARY

Embodiments of the present invention include systems and corresponding methods for immersive surveillance. Example systems include an array of cameras, each of which is disposed to image a respective portion of a wide-area scene at a respective distance. Together, the array of cameras provides a spatially continuous view of the entire wide-area scene at a substantially constant spatial resolution throughout the entire scene. Example spatial resolutions may be about one meter or less and about 1.5 cm or less. Each camera in the array of cameras can includes a lens whose focal length is selected to maintain the substantially constant resolution throughout the entire scene. Each camera in the array of cameras may also have a field of view that overlaps with fields of view of neighboring cameras in the array of cameras. The system may be modular, with each module including at least one camera and its associated lens and electronics.

Embodiment cameras may further include a fisheye camera configured to image the (substantially all of the) scene and a processor operably coupled to the array of cameras and to the fisheye camera. The processor can be configured to register image data acquired by the array of cameras to the scene based on data from the fisheye camera. In some embodiments, the processor is further configured to compress image data acquired by the array of cameras.

Example systems may also include memory configured to store image data acquired by the array of cameras and a server configured to serve the image data stored in the memory at a resolution up to and including the substantially constant resolution. The memory can be further configured to store the image data in an image format. Example systems may also include an interface coupled to the server and configured to enable a user to request at least a portion of the image data at a given resolution. In these examples, the server is further configured to serve requested image data based on the user request and registration data stored in the memory.

Other embodiments include a surveillance system comprising an array of cameras, a fisheye camera, and a processor. Each camera in the array has a field of view that overlaps with fields of view of neighboring cameras in the array. The fisheye camera has a field of view that substantially encompasses the fields of view of cameras in the array of cameras. The processor, which is operably coupled to the array of cameras and to the fisheye camera, is configured to register imagery acquired by the array of cameras to a scene based on imagery acquired by the fisheye camera.

Further embodiments include an interface for a surveillance system that monitors a scene. The interface includes a full-scene view configured to render a panoramic image of the entire scene monitored by the surveillance system and a zoom view configured to render a close-up of a region of the panoramic view; the rendered images may be pre-warped or otherwise compensated for distortion. The full-scene view can be further configured to enable a user to select a region of the scene for display in the zoom view.

Example interfaces can be further configured to enable at least one user to set at least one zone in the panoramic image to be monitored for activity. The interface is can alert the at least one user upon detection of activity in the at least one zone; it can also populate an activity database with an indication of detected activity in the at least one zone. The interface may further include an activity view configured to display the indication of detected activity to the at least one user in a manner that indicates a time and a location of the detected activity. In some cases, the interface can display images of detected activity in at least one of the full-scene view and the zoom view.

Further example interfaces may be configured to track a target throughout the scene and to display an indication of the target's location in at least one of the full-scene view and the zoom view. These examples can also enable a user to select the target.

Yet further embodiments include a system for and method of rendering an image representing a selected region of a field of view imaged by an array of cameras. First, the system determines selected cameras in the array of cameras that image at least a portion of the selected region of the field of view. Next, the system determines image tiles within the images acquired by the selected cameras to render the image of the selected region of the field of view; it then renders the image as a composite of the image tiles. In addition, the system may balance color and/or white levels, as well as correct non-uniformity and/or distortion.

Example rendering may also include determining a minimum resolution to render the image and rendering the image tiles at the minimum resolution. To alleviate bandwidth concerns, the system may request data representing the image tiles at the minimum resolution from a server, and the server may transmit the data at the minimum resolution. The server may also acquire scene data from the array of cameras; compress the scene data; and store the scene data in an image format.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7 shows how non-uniformity correction can be used to remove image roll-off.

FIG. 8 shows how demosiacing can be used to improve image quality.

DETAILED DESCRIPTION

Figure 1:
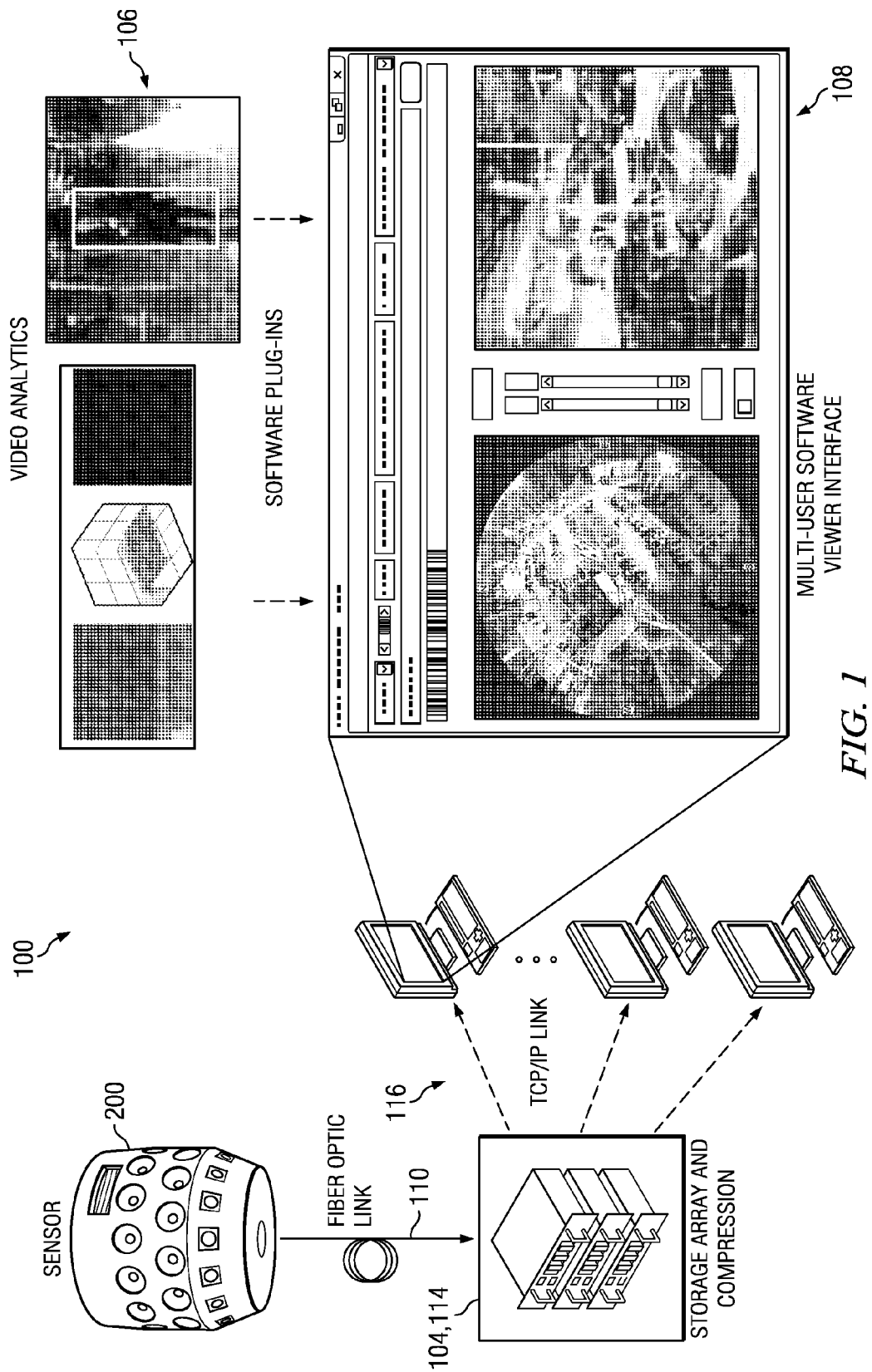
FIG. 1 is a diagram of an imaging system for immersive surveillance (ISIS) and illustrating major ISIS components.

A description of example embodiments of the invention follows. The teachings of all patents, published applications and references cited herein are incorporated by reference in their entirety.

The Imaging System for Immersive Surveillance (ISIS) is a video surveillance system designed for wide area, persistent surveillance from a single vantage point. The system provides 360-degree video surveillance coverage in the scene by being mounted to a ceiling, tower or wall. Example applications of the system include supporting security personnel in maintaining situational awareness in an area, aiding operators in real-time decision-making, and providing a comprehensive and high-resolution record of all activity in an area of interest.

The system has other applications as well, including but not limited to the provision of operational support for facilities operators, and the acquisition of high resolution video coverage for media applications. For example, an ISIS could be used for military base protection, port security, border security, airport security, and/or casino security. An ISIS could be used at train and subway stations, at indoor and outdoor stadiums, at entertainment venues and theme parks, and at convention centers.

Advantages and Improvements Over Existing Methods, Devices, and Materials

ISIS unifies large arrays of imagers and lenses, custom image processing, custom hardware compression boards, a smart compression architecture and parallel processing to provide 360-degree scene surveillance at a resolution sufficient to identify a human face out to a radius of 100 meters in all directions simultaneously. In some embodiments, this resolution is 1.2 cm.

Currently, no commercial system can provide wide-area coverage at a comparable resolution or uniformity. Most surveillance systems use cameras with individual pan/tilt/zoom mechanisms, meaning that they either provide a wide field of view at low resolution, which makes it difficult or impossible to identify individuals, or a narrow field of view at high resolution, which means that situational awareness outside the field of view is lost. This camera provides both wide area coverage and high resolution.

A very high-pixel count sensor is useful for providing this kind of resolution. A sensor of this pixel count (240 million pixels) is not currently commercially available. The use of inexpensive imagers, lenses, and custom electronic boards that can be manufactured a low cost in quantity, combined with the use of a single installation point means that the cost per pixel is very low compared to other similar solutions. Furthermore, the unification of this system into a complete, end-to-end, transportable platform means that the solution is cost effective and quickly deployable and bypasses the need for a system integration effort in which similar components are purchased separately.

The second part of the design is a storage solution that is capable of handling these very high data rates (240 million pixels at 8 frames per second). Our tiled, multi-resolution compression scheme, accelerated through hardware-based compression in combination with an image client-server architecture, allows for efficient bandwidth usage and fast playback speeds.

Finally, the combination of the viewer software design and video analytics enables the user to interact with the very large data in an efficient way. Our viewer gives multiple users the ability to maintain wide-area situational awareness with a contextual view while simultaneously viewing different parts of the scene at high resolution through the means of the virtual pan/tilt/zoom view of the scene. Automated detection and tracking of moving objects in the scene can cue users to activity of interest instead of requiring an active search of the scene for activity.

Technical Description

FIG. 1 is a diagram of an ISIS system 100 showing major ISIS components: a high-resolution video sensor 200; a video data compression server array 104 and storage array 114; a video analytics engine 106; and a multi-user video data interface 108. The video sensor 200 can be mounted at a position that provides mostly unobstructed views of the scene, usually mounted on a ceiling, tower or wall. The current lens configuration is optimized for a sensor height of approximately 30 feet, although different mount heights are possible. Video data from the sensor 200 is transmitted to an array of computers or "servers" 104 over a bundle of fiber optic cables 110. Fiber optic cables 110 provide high bandwidth transmissions over distances as short as several feet or as long as several kilometers. For the current system, a bundle of 32 fibers 110 provides a 100 Gbps link from the camera head 200 to an array of server computers 104 and an associated hard drive array 114.

The server computers 104 are responsible for compressing the video data and writing it to an array of disks 114, as well as serving the video to video data viewer interfaces 108 resident on multiple client computers. The client computers containing the data browsing interfaces 108 are connected to the data servers 104 by a TCP/IP connection 116. This connection may be Ethernet (copper), fiber, or wireless in nature. Multiple clients may simultaneously connect to the servers 104, providing multiple users with simultaneous access to both current and past video data.

While the system 100 described herein uses a wired, gigabit Ethernet link 116, the link 116 between the server cluster 104 and client PC/interface 108 may be any packet-switching based network, including wireless and wired links. A wireless link may make a physical connection between the client PCs and server cluster 104 unnecessary, for example. Other links, for example, free space optical links, can also be used as understood by those of skill in the art.

The video data browsing interface also includes or is operably coupled to a video processing (analytics) engine 106 responsible for providing automated activity detection and image registration, and can incorporate external video analytics software as well. This video processing engine 106 may also run on the server computers 104.

Video Sensor

The video sensor includes an array of 48 5-megapixel imagers, 48 lenses, and associated electronics. Each imager is paired with a unique lens. Depending on both the application and the geometry of the scene, different numbers of imagers and a different number of pixels per imager may be used. The focal length of each lens is chosen to optimize the target resolution of the imager/lens pair to maintain relatively uniform image resolution throughout the coverage area. The field of view (FOV) of each imager-lens pair can be chosen to overlap with the FOVs of the adjacent lenses such that there are no gaps in coverage throughout the scene.

Figure 2A:
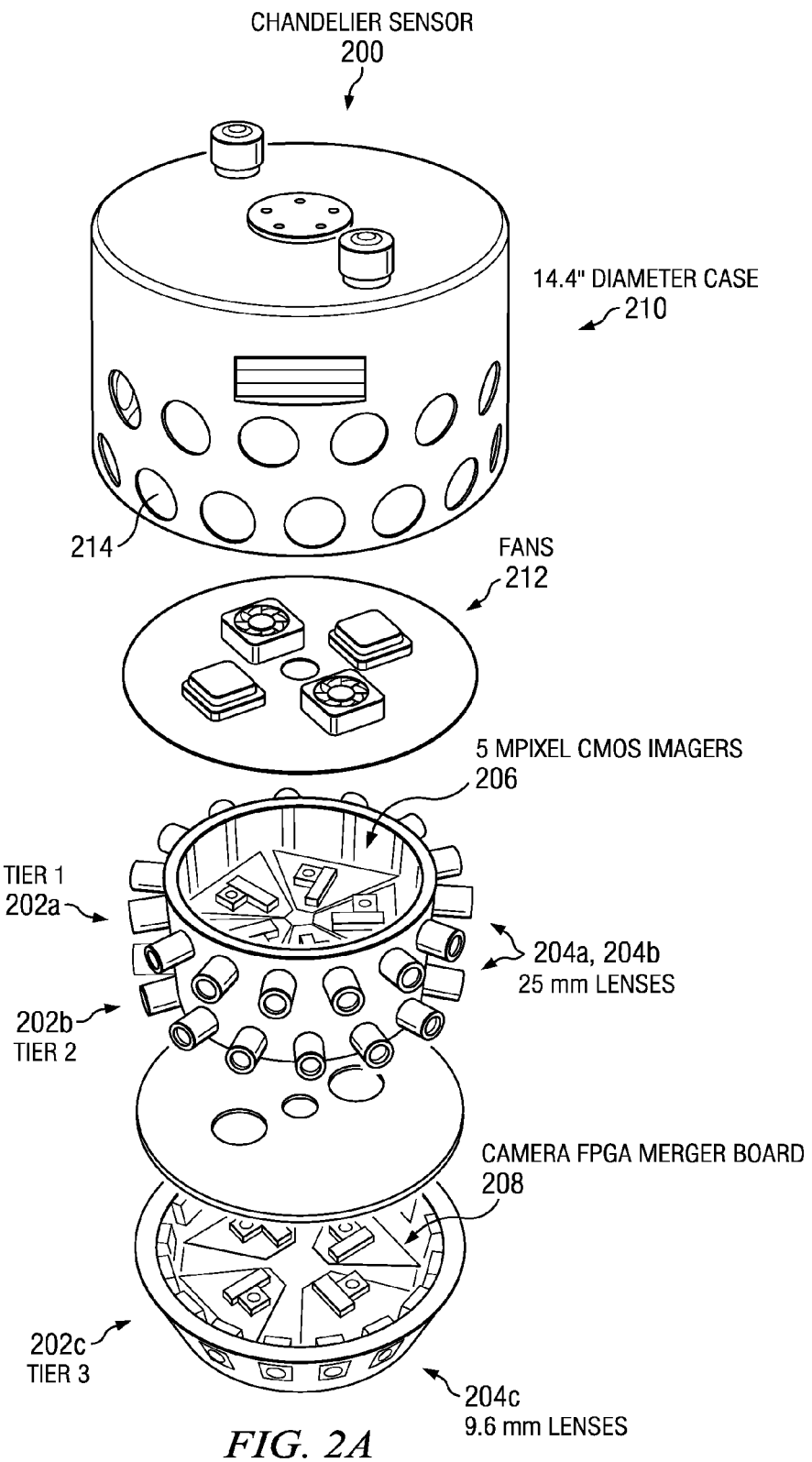
FIG. 2A is an exploded view of an ISIS camera head.

FIG. 2A shows that an example camera head 200 that contains three tiers 202*a*, 202*b*, and 202*c* (collectively, tiers 202), each with its own group of lenses 204*a*, 204*b*, and 204*c* (collectively, lenses 204), imager boards 206, and camera merger boards 208. In some embodiments, the frame to which the lenses 204 and electronics 206, 208 are mounted is made of Duraform GF, a glass-filled nylon material, formed by a technique called selective laser sintering (SLS), a type of 3D printing. The use of SLS as a manufacturing technique allowed more complex structures to be fabricated than through other methods. For example, a 5-axis CNC (computer numerical controls) machine cannot be controlled as precisely. One example of such a structure is the set of imager board insets 206 on the inside of each tier 202, which would have been difficult to machine using more traditional methods. The use of a rapid prototyping methodology like SLS also can reduce production times, for example, from several months to one week. The imagers 206 and merger boards 208 are mounted in a protective case 210, which also encloses fans 212 used to cool the electronics in the camera head 200.

The top two tiers 202*a*, 202*b* are capped by an aluminum plate which holds two ventilation fans 212 which blow the air out of the casing. Also resident on the plate are two 150 W power supplies and an RJ-45 power connector for the boards. The plate is designed so that if it is removed, the power connection is broken to prevent accidental human contact with the internal electronics while they are current.

Beneath the second tier 202*b* and separating it from the third tier 202*c* is an aluminum plate that provides structural support and which attaches to the support rods. This plate holds two additional fans which move the air upwards from the third tier up into the top two tiers. The third tier 202*c* holds eighteen lens-imager pairs (cameras). Sixteen of the lenses 204*c* are 9.6-mm lenses, which provide coverage of the scene between approximately 10 and 50 meters from the sensor. One imager 206 is paired with a 2.6-mm lens 204*c*, which provides coverage of the scene from 0 to 10 meters from the sensor. A final 1.1-mm lens 204*c* (a fisheye lens) provides full 360 degree coverage of the scene, providing reference imagery for image registration.

A 13.5" diameter case 210 covers the top two tiers 202*a*, 202*b*. This case 210 also contains transparent windows 214 that provide limited resistance to moisture and outdoor weather conditions. The case 210 contains two vents to allow the hot air being blown out of the camera to escape. The fiber bundles and power cables attached to the camera merger boards 208 inside the camera head 200 are threaded through the center of the aluminum plates and then out through the commercially available liquid-tight non-metallic conduits that are installed in the top of the case 210. Five support rods that attach to an external mount are inserted through holes in the top of the case 210, through the first aluminum plate, and to the second plate separating the second and third tiers 202*a*, 202*b*. The two pieces of glass-filled vinyl frame (the top two tiers are a single unit and the bottom tier is separated) are attached by screws to the aluminum plate along their outer rim.

Camera Geometry and Varied Focal Lengths

Figure 2B:
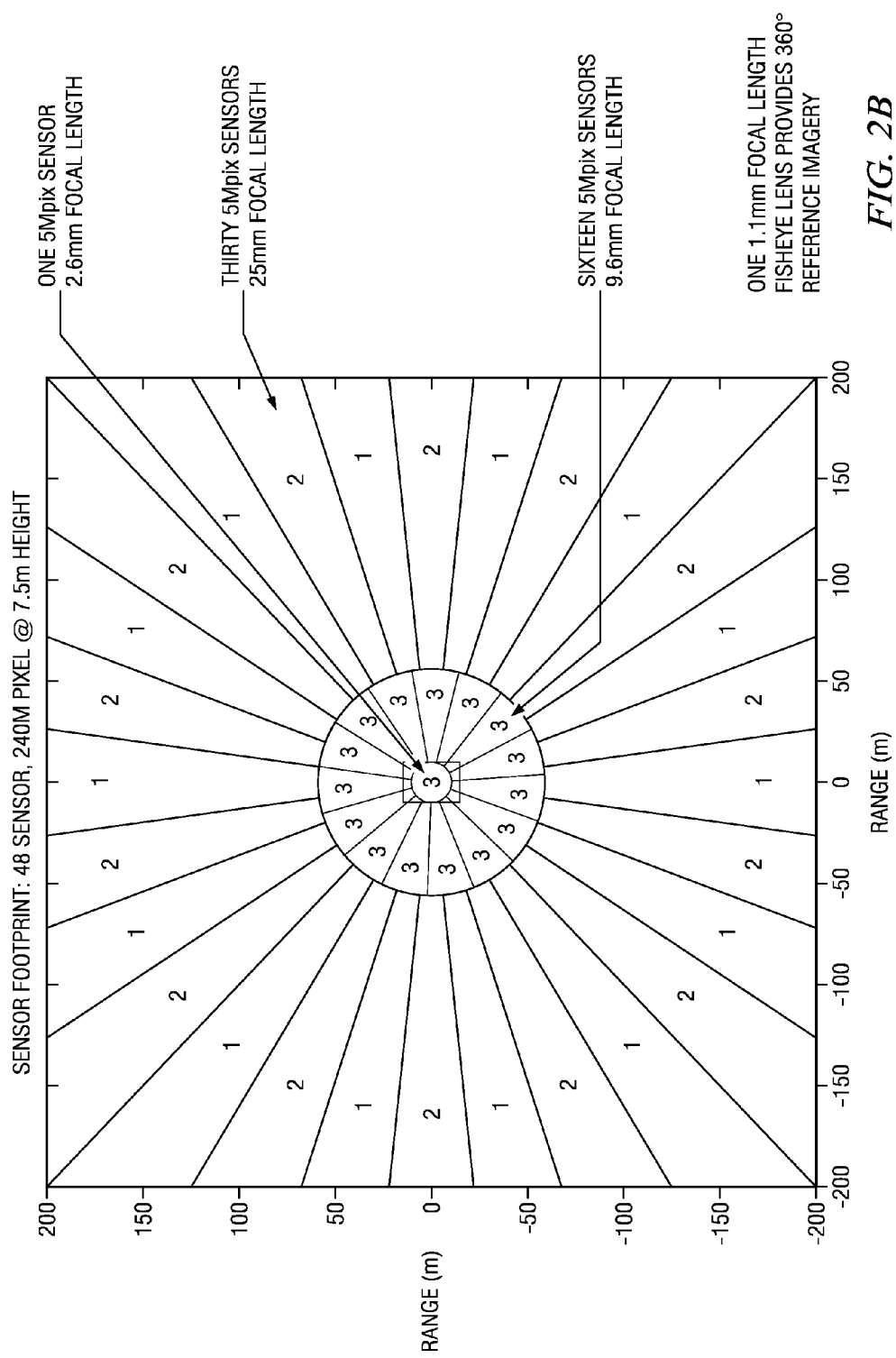
FIG. 2B is a plot that shows coverage provided by lenses in the ISIS camera head of FIG. 2A.

FIG. 2B illustrates coverage provided by lenses of the camera head 200 shown in FIG. 2A. The top two tiers 202*a*, 202*b* of the frame each hold fifteen 25-mm focal length lenses 204*a*, 204*b*, fifteen imager boards 206, and five camera merger boards 208. In some examples, each lens 204 is paired with a single imager 206. The geometry of the frame is designed such that the lenses 204 cover a continuous circular region approximately 50 m and farther from the lens 204 when the camera is placed at a 7.5 m height (the blue region in FIG. 2B). The fields of view of the sensors in each of the top two tiers 202*a*, 202*b* are offset (e.g., by the width of one-half of an imager) so that the field of view of one imager 206 is adjacent to the two imagers 206 immediately above or below it.

The geometry of the imagers 206 and lenses 204 may be chosen so that (1) the area of interest is covered with no gaps, and (2) the resolution on the objects of interest over the field of view is maintained at a desired level as the distance from the sensor increases. Assuming that a high level of resolution is desired everywhere in the scene, then the optimal use of the number of pixels in the sensor array 200 is to make the resolution stay within a particular range, or as constant as possible within the scene. In other words, the cameras (imagers 206) and their respective lenses 204 are chosen to provide a substantially constant resolution across the entire scene.

In some embodiments, the ISIS system 100 achieves this goal through a tiered lens approach. Different tiers of lenses 204 have varied focal lengths, so that a given tier (e.g., an upper tier 202*a*) contains lenses 204 having a certain type of focal length (e.g., lenses 204*a* long focal length). In one such embodiment, the upper tiers 202*a* of the ISIS system 100 contains lenses 204*a* having longer focal lengths, and the lower tiers 202*b*, 202*c* contain lenses 204*b*, 204*c* having shorter focal lengths. In this way, the upper tiers 202*a* give a higher angular resolution necessary to maintain constant spatial resolution on more distant objects, and the lower tiers 202*b*, 202*c* have a lower angular resolution, but because of the closer proximity to the targets in question, maintain a relatively constant spatial resolution on the target with in the field of view of interest—in one such embodiment, 100 meters or less from the sensor. It is to be understood that other arrangements are possible, for example, an alternative ISIS system having shorter focal-length lenses in the upper tiers and longer focal-length lenses in the lower tiers, or an alternative ISIS system having tiers that contain both shorter and longer focal-length lenses.

As described above, the ISIS sensor 200 of FIG. 2A has three tiers 202 of lenses 204. The top two tiers 202a, 202b contain 25 mm lenses 204a, 204b. The fields of view of each of the lenses 204a, 204b are staggered by the field view of one lens so that the top two tiers alternate in their coverage of particular scene as the user pans around the scene in azimuth. This arrangement allows the lenses 204 and imagers 206 to be packed in a tighter configuration and allows the sensor 200 to be significantly smaller. The bottom tier 202c contains shorter focal length lenses 204c because the imagers 206 on the bottom tier 202c are looking directly down.

The tiered design allows a graduated focal length along the sensor in a vertical direction—much like a bifocal/trifocal design on a pair of human glasses, or a graduated lens. It should be noted that the lenses need not be tiered—they can be arranged in different geometries—and that the number and arrangement of tiers depends on the application. In addition, the number of lenses and number of different focal lengths can be varied depending on the desired spatial resolution and the desired uniformity of spatial resolution across the scene.

Figure 2C:
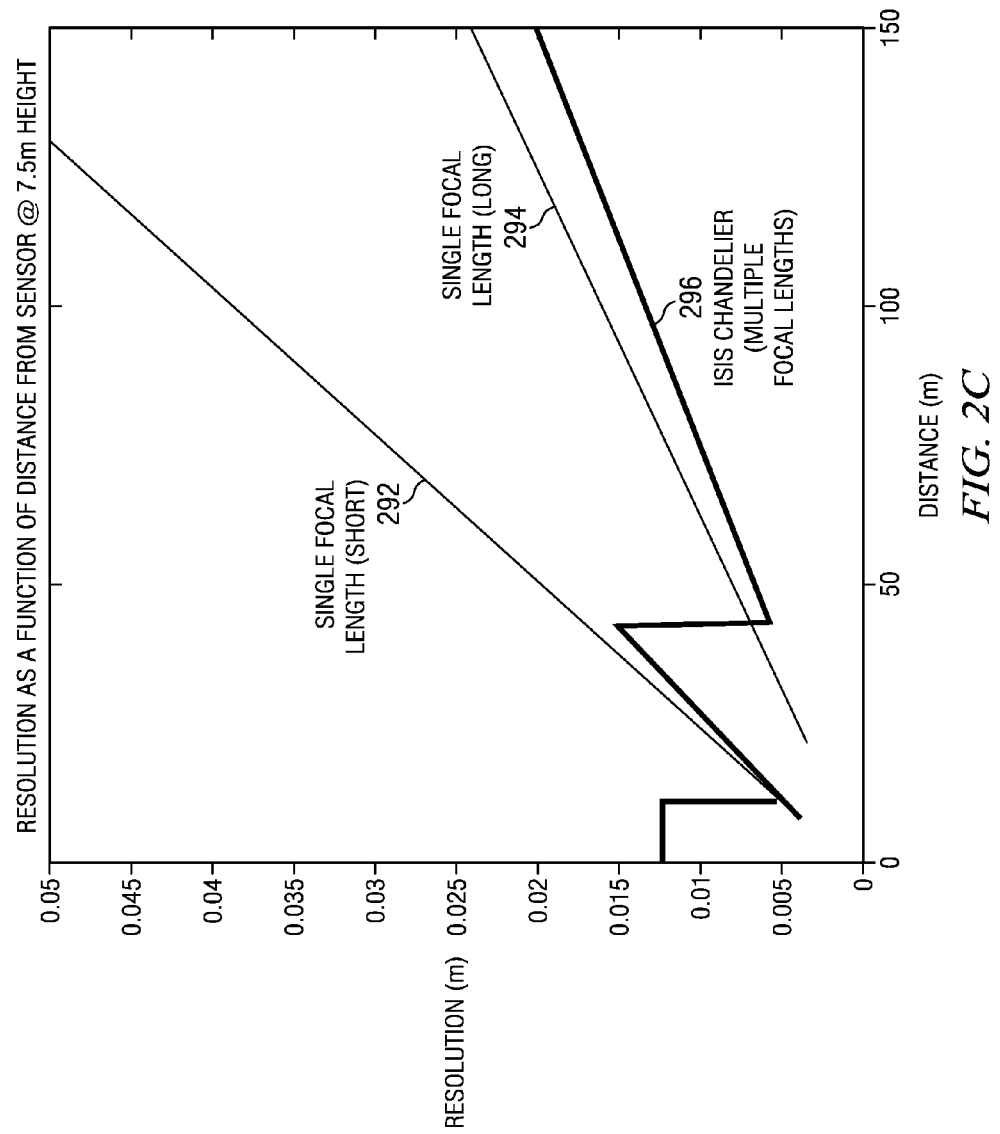
FIG. 2C is a plot of resolution versus target system for the ISIS camera head of FIG. 2A and two single-focal-length surveillance systems.

FIG. 2C is a plot of the spatial resolution of targets as a function of distance for surveillance systems with single focal lengths and for the ISIS sensor 200 (FIG. 2A) mounted at an example height of 7.5 m above the ground plane. Targets are assumed to be on the ground plane for the purposes of this graph. The spatial resolution of a camera with a single-focal length lens varies linearly with distance to the target at a slope depending on the focal length as shown by lines 292 and 294. In contrast, the ISIS sensor 200, which includes cameras with multiple focal lengths, provides a substantially constant resolution (e.g., between about 5 mm and about 15 mm) over the entire field of view as shown by line 296. The line 296 is jagged because each tier 202 of the sensor 200 has lenses 204 of different focal lengths and because the lenses 204 in each tier 202 have different distances to their respective targets. Note that the optical design of the sensor head 200 is optimized to see out to a distance of 100 meters, although the diagram shows a coverage area of 200 meters.

A sensor head with more tiers and/or lenses of a greater number of different focal lengths enables the sensor to obtain imagery whose spatial resolution is more uniform as a function of target distance. A greater number of different focal lengths also yields a spatial resolution versus target distance that would be represented by line a line on the plot in FIG. 2C with many small "jags," each of which may be centered about a mean spatial resolution. The number of lenses, number of different lens focal lengths, lens focal length values, and target distance(s) determine an ISIS system's exact spatial resolution and the uniformity of the spatial resolution across the entire scene.

Camera Head Electronics

Besides the lenses 204, frame and cover, the sensor head 200 shown in FIG. 2A contains three major categories of electronic components: 48 imager printed circuit boards (PCBs) 206, sixteen camera merger PCBs 208, and two power boards.

Each of the imager boards 206 can be paired with a single lens 204, as described above, and carries a single Micron imager, the MT9P001 (other imagers may be used). The MT9P001 is a 5-megapixel CMOS 12-bit digital RGB Bayer pattern image sensor. It is capable of 15 frames per second (fps) at full resolution while consuming less then 400 mW of power. It incorporates sophisticated camera functions such as windowing, column and row skip mode, and snapshot mode, programmable through a simple two-wire serial interface. The board 206 also contains a PROM for imager identification purposes, and a ribbon cable connector for bidirectional data/control signals and power.

Each camera merger PCB 208 interfaces to three of the imager PCBs 206 via ribbon cables. A Xilinx Virtex 5 field programmable gate array (FPGA) on the camera merger PCB 208 is used to clock the imagers 206 at 96 MHz and capture data acquired by the imagers 206. One frame at a time, the data from all three imagers 206 is transferred from the FPGA to a 1-Gigabyte DDR2 SDRAM module at 400 MHz. The camera merger PCB 208 has two DDR SDRAM modules in order to perform a ping-pong data transfer scheme, i.e., data is written to one memory while read back from the other. The data being read from memory is transferred, via a 3.125 Gigabit fiber-optic interface, to a data server containing a custom PCI JPEG2000 compression board. The camera merger PCB 208 also contains power conditioning circuitry for local components as well as for the Micron Imager. Other brands of FPGA and memory configurations may be used as well.

Two power boards (not shown) are located in the top tier 202a of the sensor head 200. Each power board contains a 150 Watt DC-DC converter from Vicor. The Vicor module accepts 24 volts and outputs 3.3 volts. Other brands of DC-DC converter may be used. In other embodiments, the power boards may be located elsewhere in the ISIS system.

Modularity

The electronics in the camera head are designed in a modular fashion so that the camera head itself can be broken into several pieces to accommodate the geometry of the mounting point. For example, mounting the camera to four faces of a building to provide 360-degree coverage is possible by breaking the camera into four pieces. The electronics in the camera are designed so that sub-cameras maybe broken out with no modification necessary to the back end collection electronics or viewer software. The current design divides the imagers into groups of three, but sub-cameras with as few or as many imagers as desired are possible.

Figure 3A:
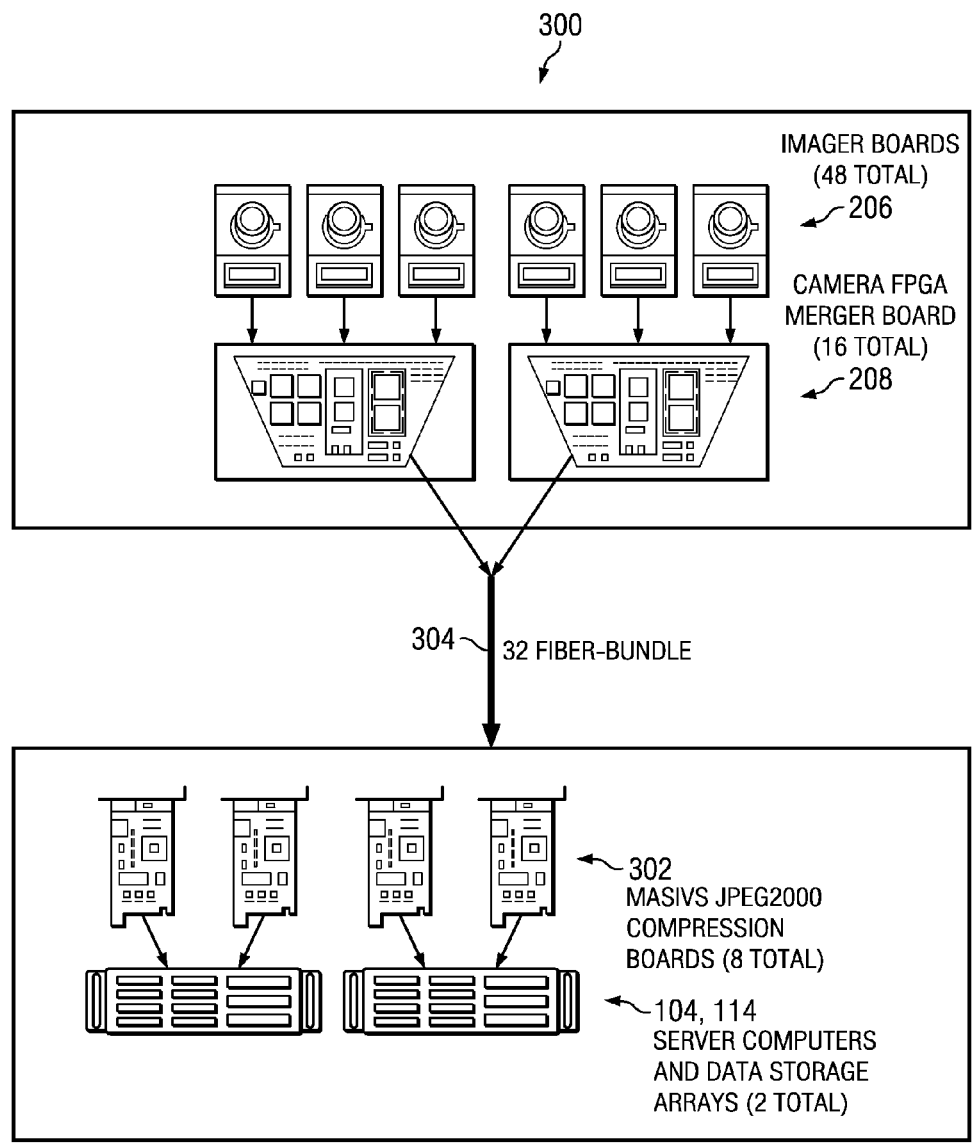
FIGS. 3A and 3B illustrate example compression architectures suitable for use in ISIS systems.
Figure 3B:
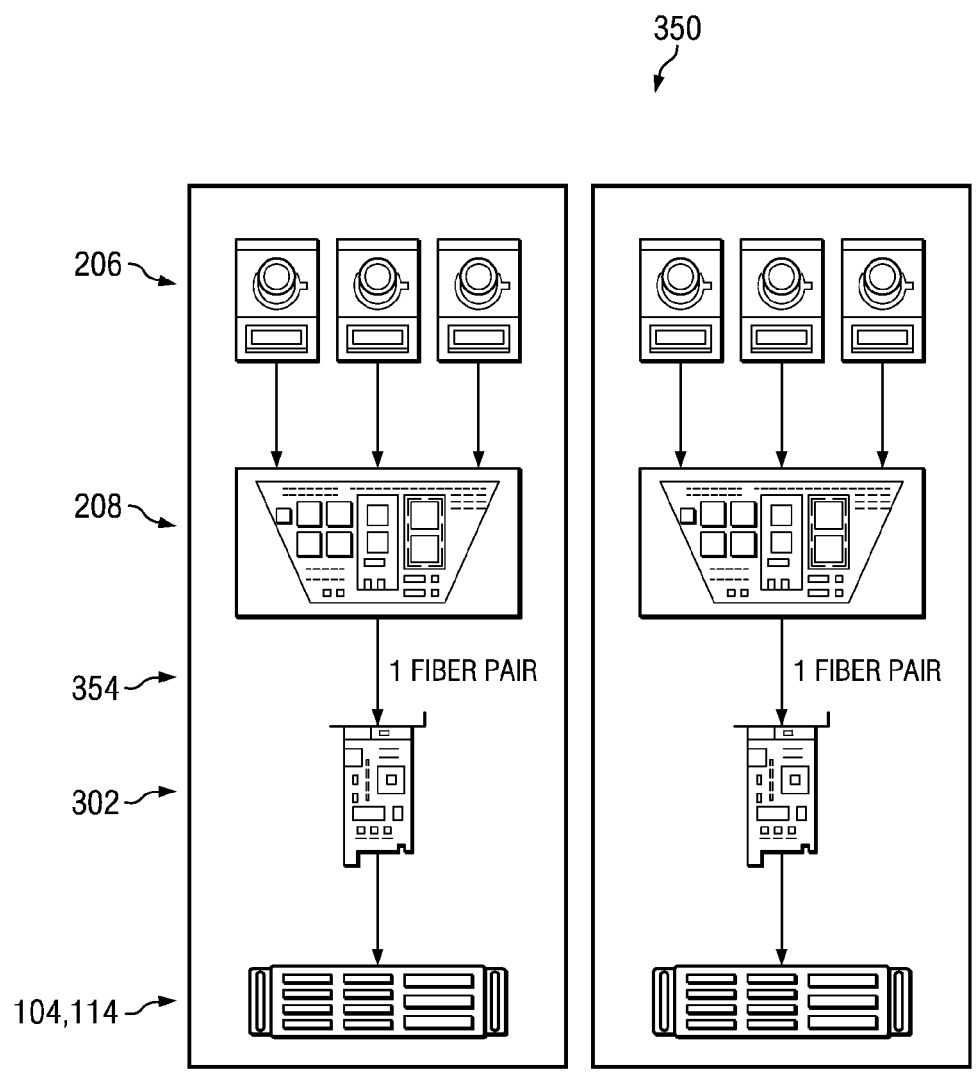

FIGS. 3A and 3B illustrate alternative architectures 300 and 350, respectively, for image data acquired by the ISIS system 100 and camera head 200 described above. The ISIS system 100 includes four compression boards 302 per computer server 104, for a total of eight compression boards 302 distributed over two computer servers 104. Each computer server 104 receives a compressed data stream from each of the compression cards 302 over the internal data bus. The data is written to a multiple terabyte array of hard drives 114 that is also resident in each computer server 104. The array of hard drives 114 are configured as a redundant array of independent drives (RAID) to maximize both throughput and data redundancy for robustness to drive failure. The compression boards 302 export the data to a computer server over a data bus and the data is stored on a hard drive array.

Each camera merger board 208 can transmit data over a single fiber pair 354 and thus this makes a natural module and working unit. In a single-camera module embodiment 300 of the sensor 200, shown in FIG. 3A, all sixteen camera merger boards 208 reside in a single housing, and the fiber pairs 354 are grouped into a single fiber bundle 304. However, each camera merger board 208 or group of camera merger boards 208 can be broken into its own unit, as shown in the architecture 350 of FIG. 3B, so that if the camera head 200 were to be broken into multiple pieces, the system 100 would not need to be redesigned—rather each merger board 208 and associated imagers 206 could reside in its own housing, be mounted separately, and each fiber pair 354 could be run separately to an associated compression card 302 or server 104, as shown in FIG. 3B. Furthermore, each compression card 302 could reside in a different server 104, and the servers 104 need not be co-located, as long as they reside on the same network. Thus, the system 100 is modular at the camera head level, the compression card level, and the server level, and these items need not be co-located.

Video Data Compression Solution

The video data being transmitted from the camera merger boards are compressed using JPEG2000 compression boards (other image and video compression techniques may be used as well). Each compression board receives video data from two camera merger boards over 3.125 Gigabit fiber. The compression boards compress the data in a tiled, multi-resolution format. The data is encoded progressively such that multiple quality levels of imagery with varied regions of interest (ROIs) can be requested at a later time.

Figure 4:
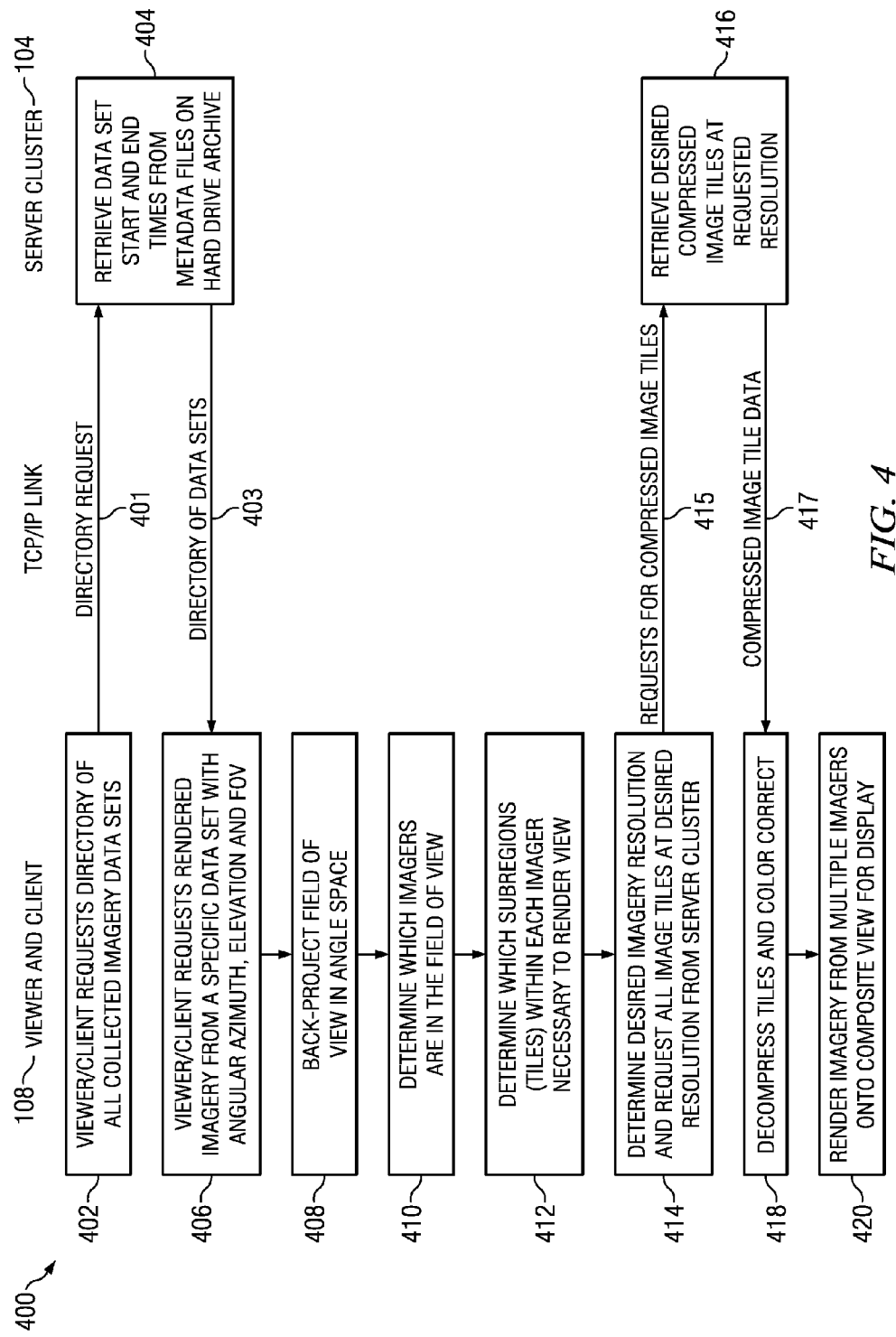
FIG. 4 illustrates client-server operation for an example ISIS system.

FIG. 4 illustrates an example operation 400 of an image client-server software architecture that serves image data efficiently, such as the architecture 300 of FIG. 3. A viewer interface 108 on a client computer sends a directory request 401 to the server cluster 104 for a directory of all collected imagery data sets (402). The server cluster 104 retrieves the data set start and end times (404) from metadata files stored in the hard drive archive 114, then forwards the requested directory 403 to the viewer/client 108.

Next, the viewer/client 108 requests imagery for a particular angular field of view (azimuth, elevation and angular width) sufficient to render an image of a particular size (406). Using image registration information (described below), the viewer/client 108 is able to back-project (408) the field of view in angle space to regions on specific imagers. This allows the viewer/client 108 to determine which imagers of the 48 imagers in the array are collecting video from this angular coverage area (410); which "tiles" or sub-regions within each imager are necessary to render the view (412); and the quality level or resolution of imagery is necessary to render the view of the scene at the desired size (414).

The viewer/client 108 then sends a request 415 for compressed with the appropriate message headers over TCP/IP to the cluster of servers 104 for imagery for the tiles of imagery from the desired imagers at the desired resolution/quality level. The server 104 retrieves the requested data from the hard drive array (416), packages the data with the appropriate headers, and sends the packaged data 417 back to the viewer/client 108 that requested the data over the TCP/IP network connection. By sending only the imagers, tiles and minimum quality level necessary to render a particular angular view, data bandwidth over the TCP/IP link is minimized. The viewer/client 108 decompresses and color corrects (418) the compressed image tile data, then renders the decompressed image tiles in a composite view (420).

The ISIS architecture is open to both video-based compression (which takes advantage of temporal correlation between frames and uses key frames to reduce data size) and still image compression (where each image is stored as a separate image with no correlation between frames). The advantage of using still image compression is that the user, upon "seeking" in the browser to a particular moment in time, may pull up the image very quickly without waiting for the video to "buffer" and being able to play back. This instant seek allows the user to more efficiently browse the data for a particular object, person, or event.

Video Processing

Figure 5:
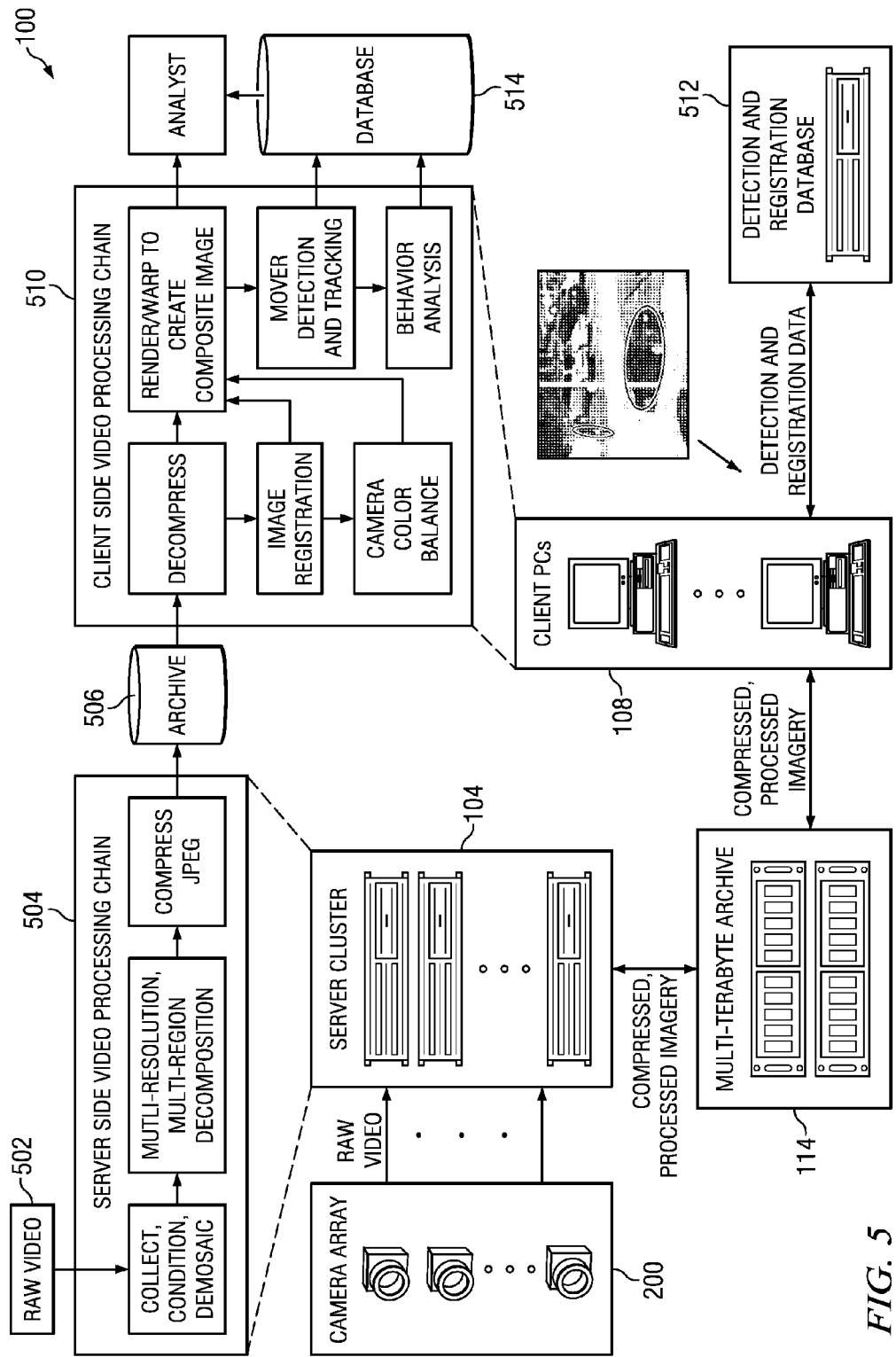
FIG. 5 illustrates ISIS processing architecture and data flow.

FIG. 5 illustrates an example processing architecture and data flow for the ISIS system 100 of FIG. 1. Raw video data 502 collected by the camera array 200 undergoes three processes: image registration and conditioning, compression, and video processing. In the architecture shown in FIG. 5, a server-side video processing chain 504 implemented on the server cluster 104 collects, conditions, and demosaics the raw video data 502. The server cluster 104 decomposes the conditioned video data into multiple regions (tiles) at several different image resolutions; the server cluster 104 then compresses the tiles, e.g., in the well-known JPEG format. The compressed tiles are archived 506 in the disk array 114.

A client-side video processing chain 510 implemented with the video analytics engine 106 of the interface/client 108 also performs several aspects of the video analytics described in greater detail above and below. Specifically, each interface/client 108 decompresses image tiles delivered by the server 104, registers the decompressed tiles, and corrects for image warping and color misbalance. (The interface/client 108 may also retrieve and store image registration data in a detection and registration database 512.) The interface/client 108 also tracks moving targets, performs behavior analysis, and stores indications of detected motion in a database 514. Those skilled in the art will appreciate that other architectures are also possible; for example, the servers 104 may perform image registration and store registration data in the disk array 114.

Image Registration and Conditioning

The ISIS system viewer 108 is responsible for rendering an interactive virtual camera view of the scene and displaying it to a viewer (user). This virtual camera is an arbitrary angular field of view into the scene that is independent of the field of view of any single lens or imager. The user has the ability to request a particular angular field of view and have the resultant imagery appear as if it came from a single image-lens combination, even if imagery from multiple imagers are necessary to create that imagery. Thus, the relative position, point angle and focal lengths of each imager must be determined to a sufficient degree of accuracy, and the imagery from each imager must be warped, resized and placed in the virtual camera at the correct position so that the transition from one imager to another appears to be seamless. This process is called image registration.

As described above, the camera head 200 of FIG. 2A is comprised of 48 lens-imager combinations, or 48 sub-cameras (48 is an arbitrary number, other numbers can be used). Of these, most have a narrow field of view (<30 degrees); these are designated "projective" cameras because they can be modeled fairly accurately as a flat projection of a three-dimensional (3D) world onto a plane perpendicular to the camera's optical axis. There is one camera used to provide reference imagery that uses a very wide angle "fisheye" lens to provide a 360-degree view of the scene. Each of these two types of cameras is modeled differently.

Most lenses contain unique distortion characteristics imparted at the time of manufacturing. Each lens-imager combination is therefore calibrated and distortion parameters are estimated for each. These parameters are applied to the imagery to remove the distortion.

For projective cameras, the ISIS system 100 calculates distortion parameters and combines these parameters with the projection matrix, which is computed from an initial gross azimuth/elevation point angle estimation of the camera. For the fisheye lens/imager combination, fisheye distortion parameters were computed using a publically available calibration software toolbox. These distortion parameters were used to more accurately map camera pixels to 3D world coordinates.

Because the fisheye camera provides imagery that covers 360 degrees, the fields of view (FOVs) of each projective camera are a subset of the fisheye camera's FOV. By overlaying the imagery taken by the projective camera on top of the imagery captured by the fisheye lens camera, the ISIS system 100 provides a single, seamless common reference frame for all of the projective cameras. Matching the projective camera imagery to the underlying fisheye reference image is a process called image registration.

Figure 6:
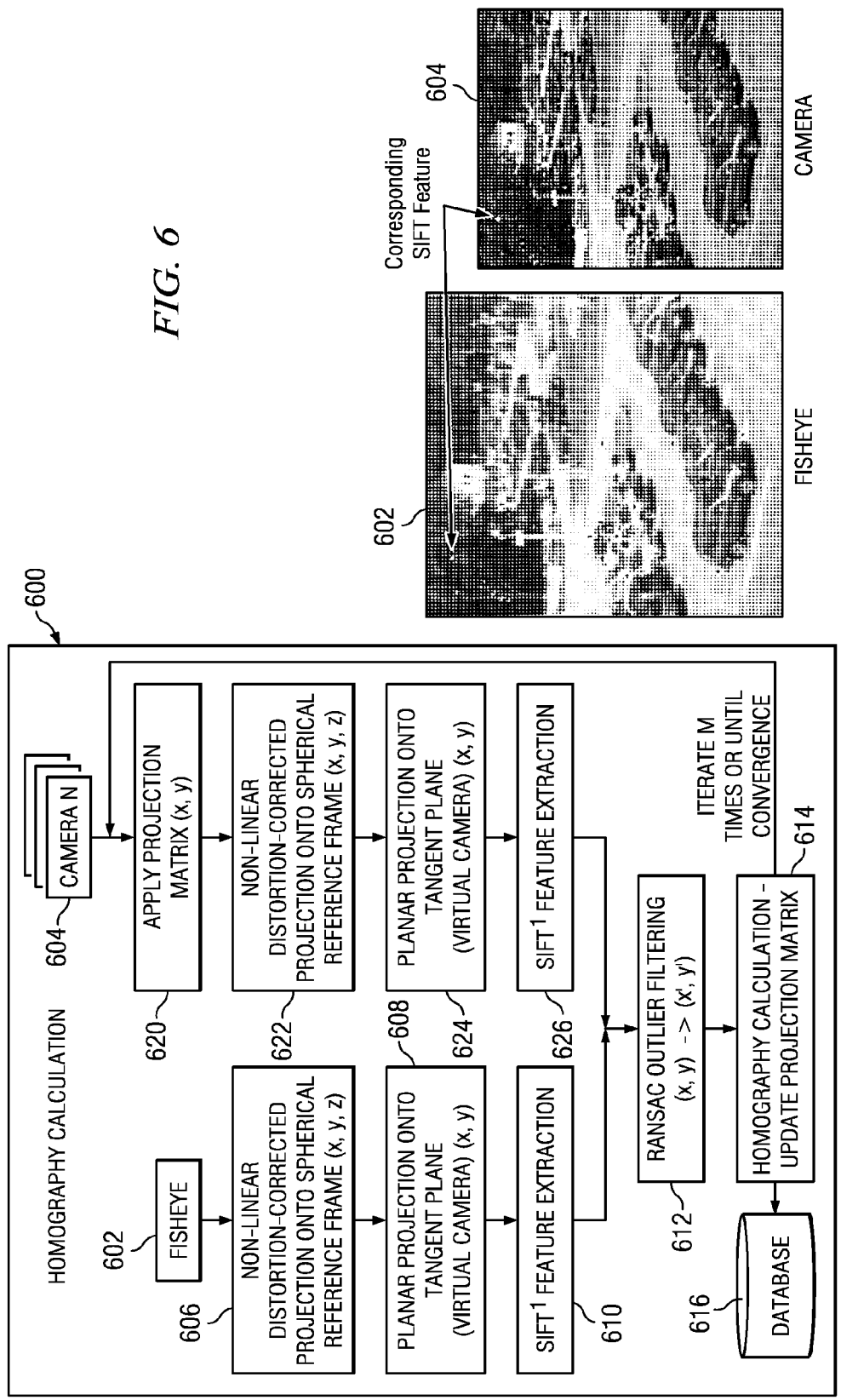
FIG. 6 illustrates an ISIS registration process.

FIG. 6 illustrates an example image registration 600 performed by the ISIS system 100 using imagery 602 acquired by the fisheye camera and imagery 604 acquired by at least one other camera in the sensor head 200. To project image data onto an image plane perpendicular to the optical axis of the virtual camera view being generated, the image must be warped by the means of a "transform" or a linear algebra operation on the image data. Because of the 360-degree nature of the fisheye camera imagery 602, the fisheye camera imagery 602 is best represented with a 3-dimensional spherical model. The registration process 600 performed for each projective camera by the ISIS system 100 is as follows:

1. Project projective camera imagery 604 according to current projection matrix (initialized to default value based on rough estimate of point angle) (620), and render a non-linear, distortion-corrected projection of the reprojected camera imagery onto a spherical, 3-dimensional model in (x, y, z) space (622).
2. Render a non-linear, distortion-corrected projection of the fisheye camera imagery 602 onto the spherical, 3-dimensional model in (x, y, z) space (606).
3. Render a "camera view" planar projection from the spherically projected imagery of both fisheye and projective imagery 602, 604 in a local angular area of overlap onto the tangent plane (virtual camera) in (x,y) space (608, 624).
4. Find Scale Invariant Feature Transform (SIFT) features in both images (610, 626).
5. Filter outliers from SIFT using RANSAC (short for Random Sample Consensus, developed by Fischler and Bolles in 1981) (612).
6. Compute homography between filtered SIFT features in the fisheye camera and projective camera views and compute registration matrix (614). This registration matrix updates the projection matrix used in step 1.
7. Iterate through the registration process 600 until the homography converges, or a specified maximum number of iterations (e.g., M) has been reached.

For more on SIFT, see David Lowe, "Object recognition from local scale-invariant features," Proceedings of the Seventh IEEE International Conference on Computer Vision (ICCV 1999), volume 2, page 1150, 1999, which is incorporated herein by reference in its entirety.

In addition to registration, which determines the geometry of the reconstructed imager, the imagery can be "conditioned" or adjusted so that the user can view imagery that has excellent color balance, contrast and sharpness.

Non-Uniformity Correction

One characteristic of lenses and apertures in a typical camera is that there is some natural fall off from the center of the optical axis on the imager going towards the edge of the imager. This falloff would result in imagery that looks "faded" at the edges of each imager, as shown in the left-hand image 702 in FIG. 7. To prevent this effect, the imager/lens combination is "flat fielded" to compensate for intensity roll-off and non-uniformities in the light path to the imager, and to compensate for the relative color sensitivity of each imager.

To correct for this roll-off, an integration sphere with an internal xenon lamp was used with each with lens/imager combination at the desired f-stop/focus configuration. For each lens-imager pair in the ISIS 100 of FIG. 1, fifteen frames were collected and averaged to form a single frame on a single pixel-by-pixel basis. The overall mean value of all of the pixels in the average frame was computed. An adjustment image 704 was computed. Each pixel in the adjustment image 704 is the overall mean value divided the value of the average frame at that same pixel location. This adjustment image 704 was saved to disk and applied to raw images 702 as it was collected; that is, the raw image 702 is divided it, pixel by pixel, by the adjustment image 704 to produce a compensated image 706 that is saved to the disk array 114.

Distortion Modeling

For certain lenses, the radial distortion of the imager must be modeled. The distortion model is used to correct the imagery to maximize the accuracy of the projection. For some of the shorter focal length lenses in the system, the distortion in the lens is severe enough that we must estimate distortion parameters and apply them to the imagery to undistort the imagery. A publicly available camera calibration toolbox for Matlab developed by Caltech was used to compute these parameters for the wide-angle lenses.

Demosaicing Using Edge Sensing

Many imagers, including those used by this project, incorporate micro-lens color arrays to create a single image with pixels that alternately represent the blue, red and green light in the image at a given point. The image read off of such an imager is said to be mosaiced. The imagery can be converted to three individual full-resolution images, each representing a separate color component (blue, red, green). This process is called demosaicing and is shown in FIG. 8. One problem that can occur is that the process of filling in the missing pixels for each color to create a whole image can cause visually distracting artifacts, particularly along strong edges in the images (sometimes called "zippering"). To sharpen edges of the color-interpolated image to better represent the actual transitions in the imagery, a gradient-following approach is used. The interpolated pixels follow the direction of the strongest edge as determined by examining its neighboring pixels. Demosaicing is a common problem in image conditioning. For descriptions of demosaicing methods suitable for use with ISIS imagery, see K. Kirakawa, T. W. Parks, "Chromatic Adaptation and White-Balance Problem," IEEE ICIP, 2005, or Edward Chang, Shiufun Cheung and Davis Pan, "Color filter array recovery using a threshold-based variable number of gradients", Proc. SPIE, Vol. 3650, 36 (1999), each of which is incorporated herein by reference in its entirety.

White Balancing

White balancing is used to remove unrealistic color casts in the image, so that white images "look" white. Over the course of the day, the color temperature of the light may change, requiring occasional adjustments to the image. A white balancing tool was implemented, allowing the user to select a region that "should" be white in the image, the scaling factors to bring that imagery to true white are computed, and all of the imagery from the imager/lens combinations are adjusted to match that new ratio.

Color Balancing

Even after flat-fielding and applying corrections for the non-uniformity gain factors computed from the integration sphere experiments, differences in the images produced by each image/lens combination exist. Because each imager produces a field of view that is adjacent to the one next to it, any differences in color and roll-off may appear as visible borders or lines in the virtual camera view, detracting from the user's perception of a virtual pan/tilt/zoom. To remedy this, we use our image registration capabilities as a tool for balancing the color profile across all imagers. Once we have registered all of the imagers to the imagery from the fisheye reference image, which provides coverage everywhere in the field of view, we can render both the fisheye imagery and each projective camera at the same resolution on the same plane. In this mode, we compare 32×32 pixel blocks of imagery from the projective camera to the fisheye reference imagery in the same angular field of view and we adjust the gains of the component color channels for the block in the projective camera to match the corresponding block in the fisheye lens. Because the color in the fisheye 360-degree field of view changes gradually and continuously, a smooth and continuous look across all of the projective imagers is achieved.

Contrast

An auto-contrast process automatically stretches the dynamic range of the pixels being displayed as the composition of the virtual camera view changes. A subset of pixels in the image is sampled and a histogram of those pixels is computed. The pixel values corresponding to the 5th and 95th percentile are remapped with a gamma factor (log stretch) to the full dynamic range of the display, improving the ability of the user to see objects in the scene, especially darker scenes.

Compression

Figure 9:
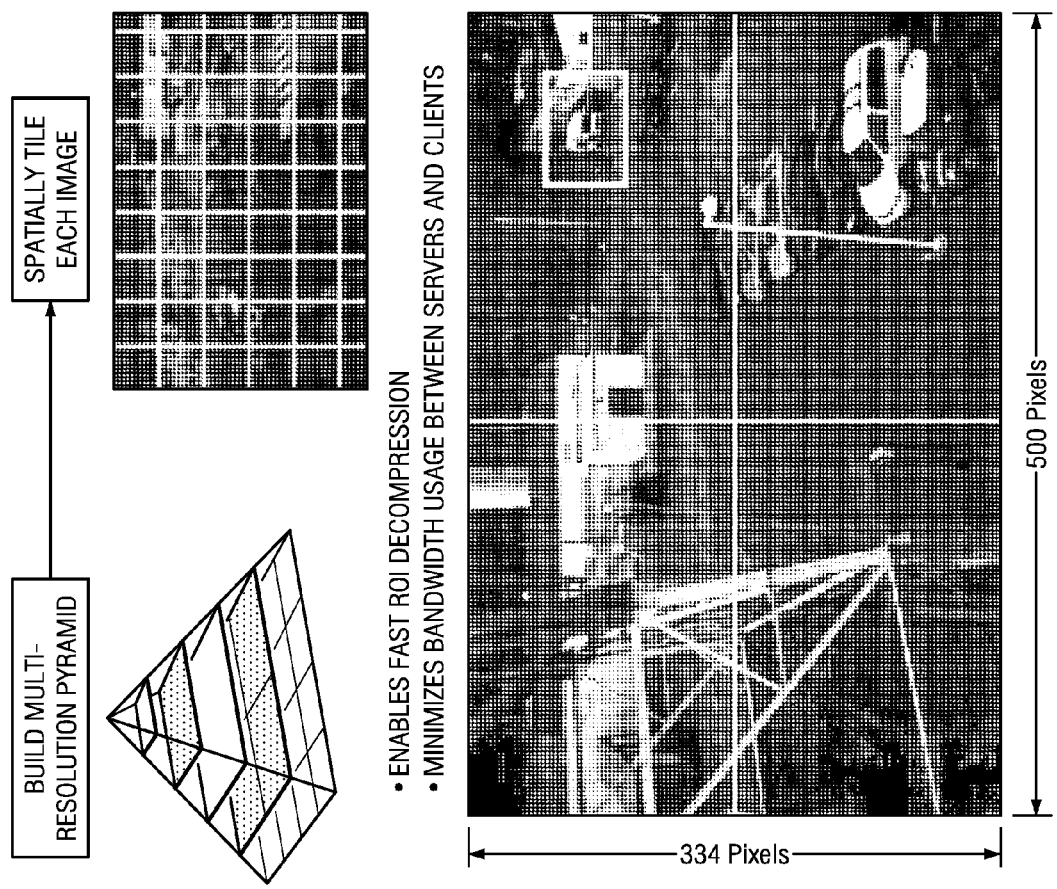
FIG. 9 illustrates an example ISIS compression process.

FIG. 9 illustrates a tiled, multi-resolution compression technique that can be used to compress data acquired with an ISIS system. Tiling allows the data to be retrieved in a modular way to render a particular FOV without the need to access all of the data in a spatial sense. Multi-resolution encoding allows the user to retrieve data at a resolution appropriate to the FOV and screen resolution of the viewer. Both of these characteristics work to minimize the usage of network bandwidth. A custom pyramid and tiling format was developed by MIT Lincoln Laboratory; this compression format can be used instead of the commercially available JPEG2000 format.

Video Analytics

The video analytics engine 106 performs adaptive statistical background modeling and model-based tracking to supply information about activity in the scene to the operator both in real time and forensically.

Directional Activity Detection

Figure 10:
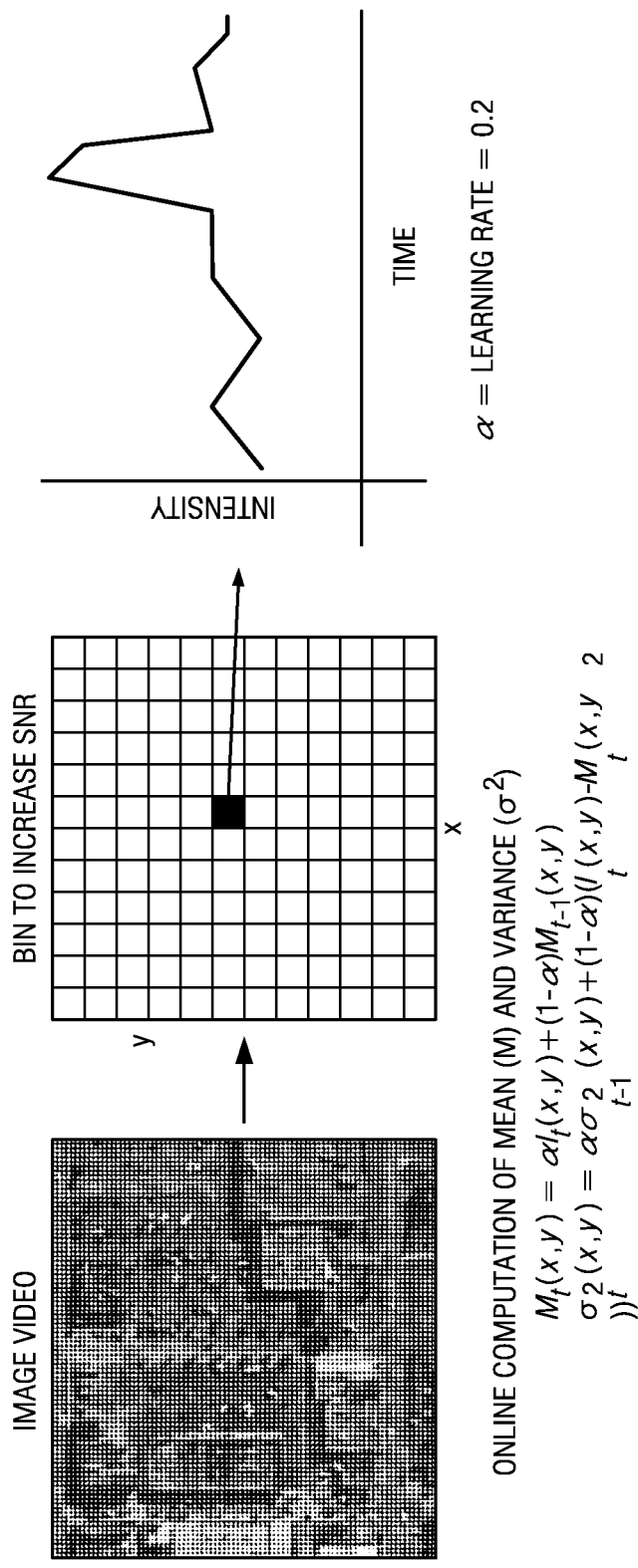
FIG. 10 illustrates adaptive statistical background modeling suitable for use with ISIS image data.

The user, through the viewer, can choose a field of view that can be screened for activity, which is defined as a change in the scene that deviates significantly from a statistical model of previous change in the scene. This process, which is shown in FIG. 10, can be described as follows:

1. A user specifies an angular field of view (FOV) for analysis.
2. The ISIS system bins (downsamples) the rendered image representing the FOV to improve SNR.
3. The ISIS system computes pixel-wise mean m and pixel-wise variance σ2 of the downsampled image.
4. As each new image arrives, the ISIS system updates mean and variance based on a learning rate a such that the current mean and variance image represents a weighted average of the current mean/variance frame (multiplied by α) and the past mean/variance frame (multiplies by 1–α). The ISIS system may apply a secondary slower learning rate 0 in regions where the foreground has been identified from previous iterations.
5. The ISIS system computes a difference frame (absolute value of the current frame minus computed composite mean frame).
6. The ISIS system creates a binary detection map by applying the following rule: if a difference frame pixel exceeds the value of the standard deviation model scaled by a multiplier factor (e.g., 5.5), then the binary detection map for that frame is set to 1, otherwise 0. This multiplier factor can also be variable over the entire image and can be adjusted on the fly according to a rule, for example, the incidence of blobs in the image that fall below a detection threshold.
7. The ISIS system applies a de-speckling filter to the binary detection map. The filter includes a 2D box filter applied to the binary detection map. The resultant image is thresholded again and reduced to a new binary detection map to the false alarm rate.
8. The ISIS system identifies activity in a particular image if the number of pixels in the despeckled binary detection map is less than a maximum percentage of the image and greater than a minimum percentage of the image, and that these conditions are met for N consecutive frames, where N is a specifiable integer greater than zero.
9. The ISIS system applies connected components to identify individual objects in the binary image.
10. The ISIS system determines the "directionality" of the image as either up, down, left, right, none. To do determine directionally, the ISIS system computes the centroid of the largest object as determined by connected components for each frame. If the largest object is moving in a monotonically increasing or decreasing manner over a number of frames, directionality is determined.

Tracking

Modifications to the continuously adaptive mean shift (CAMSHIFT) and Markov chain Monte Carlo (MCMC) tracking techniques were made and incorporated into the viewer. We added a segmentation front end based on our detection results to separate foreground from background when tracking moving objects. Rules to switch between tracking moving and stationary targets were implemented and prototyped. For more on the CAMSHIFT and MCMC tracking techniques, see D. Comaniciu et al., "Real-time tracking of non-rigid objects using mean shift," IEEE Conf. on Computer Vision and Pattern Recognition, II, Hilton Head, S. C., pp. 142-149, and P. Perez et al., "Color-based probabilistic tracking," European Conf. on Computer Vision, pp. 661-675, each of which is incorporated herein by reference in its entirety.

Video Data Browsing Software (Viewer)

Figure 11:
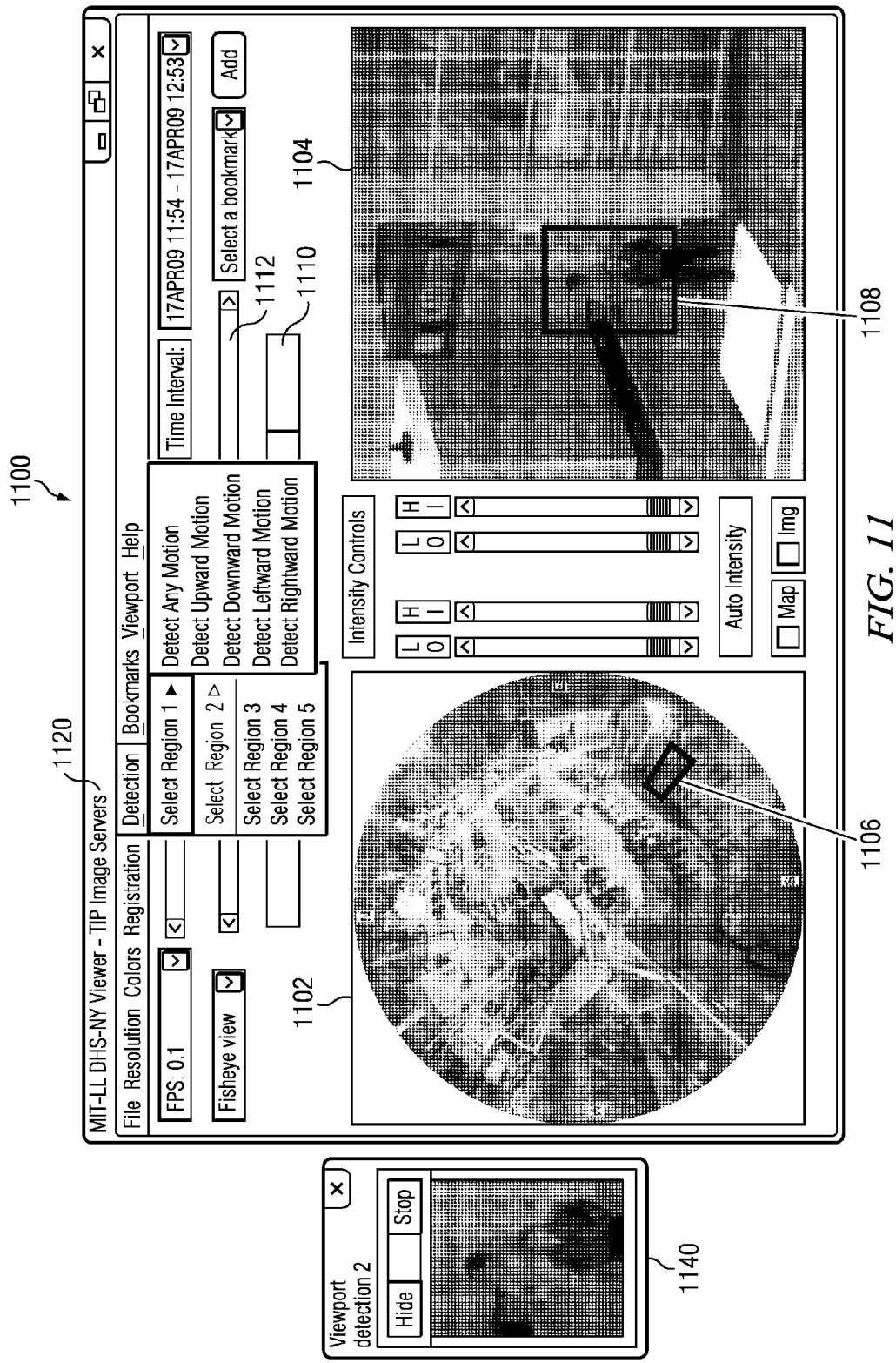
FIGS. 11-13 illustrate aspects of a user interface for an ISIS image viewer suitable for displaying and analyzing real-time and recorded data acquired by an ISIS system.
Figure 13:
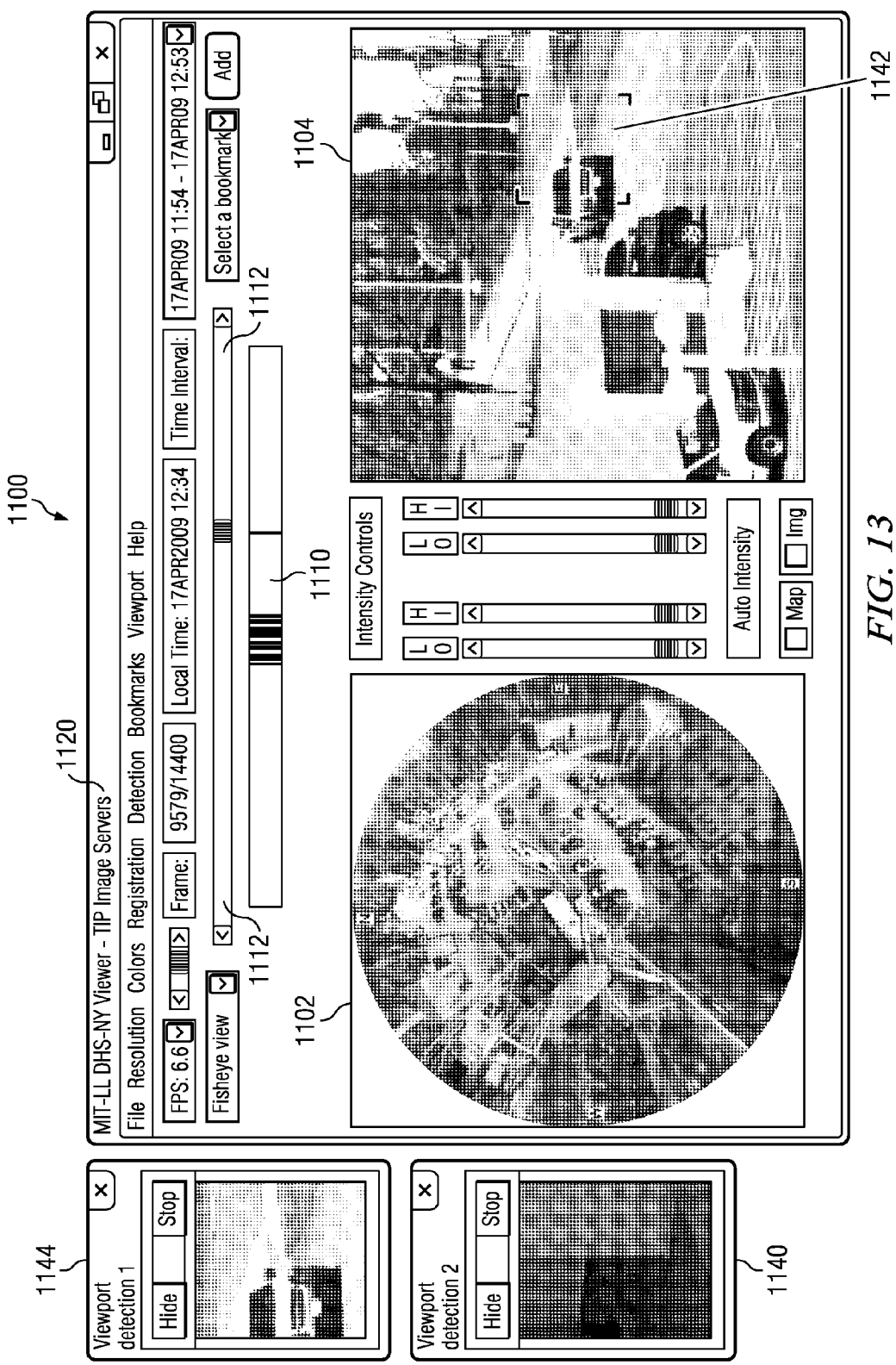

FIGS. 11 and 13 shows a screenshot of a user viewer 1100 of the interface/client 108 (FIG. 1) for displaying the imagery from the array of sensors 200 to the end user. The user view 1100 includes a 360-degree context view 1102 and a zoom view 1104 that shows a user-selected highlighted region 1106 in the context view 1102. The user view 1100 also includes an activity view 1110, which shows indications 1112 of activity in user-specified regions (exclusion zones) in the field of view, such as the highlighted region 1106. The indications 1112 may be color-coded to indicate the relative importance of the activity, in which zone the activity occurred, and/or which user initiated monitoring. The indications 1112 may also be arranged to illustrate when the activity was detected, e.g., from left to right. Menus 1120 allow the user to modify ISIS settings.

Because the data comes from many different imagers and lenses, video data from each lens/imager combination can be corrected and mathematically resampled, correcting for both perspective and distortion parameters. The viewer 1100 can also implement the video analytics and provide an interface for the user to both configure the video analytics as well as get feedback. Many of the video analytics are written for multi-threaded operation to take advantage of multiple cores on processors (parallel processing). The viewer interface 108 can also:

- Perform image warping to allow multiple camera views to be displayed as one single camera view;
- Display both 360-degree "context" view 1102 and flat rendered "video" view 1104;
- Perform virtual pan-tilt-zooms on the video view side, controllable via both keyboard and mouse click-and-drag;
- Automatically white balance and color correct to balance colors across sensors;
- Perform directional and non-directional activity detection;
- Monitor "exclusion" zones flagged by the user, e.g., in real time;
- Populate a shared activity database that includes information about directional and non-directional activity detection and/or exclusion zones;
- Determine camera regions necessary to render a particular angular view;
- Automatically pan and tilt to follow moving persons via automated tracking;
- Playback through multiple speeds, select specific frame numbers, and time intervals; and/or
- Automatically register images.

Viewer/Dual Display—Pinching of Fisheye Imager

The viewer contains two major windows (more are possible and available by selecting the appropriate options). The right hand view 1104, or the "video view", is a virtual camera that can be controlled as a virtual pan, tilt and zoom. The video view may be operated as a virtual pan and tilt by click and dragging the image using the left mouse button. Zooming may be accomplished by using the scroll wheel or by clicking the zoom buttons on the viewer. Tracking objects in the video view can be accomplished by drawing a box around an object with the right button at any time and then commencing playback.

The left window, called the context view 1102, contains a "fisheye" view or modified constant angular view of the scene, stitched together from all of the imagers. This fisheye imagery is generated by using the registration data to project all of the imagery onto a 3-dimensional sphere in (x, y, z) space, then projecting that image onto a plane for viewing.

Figure 15:
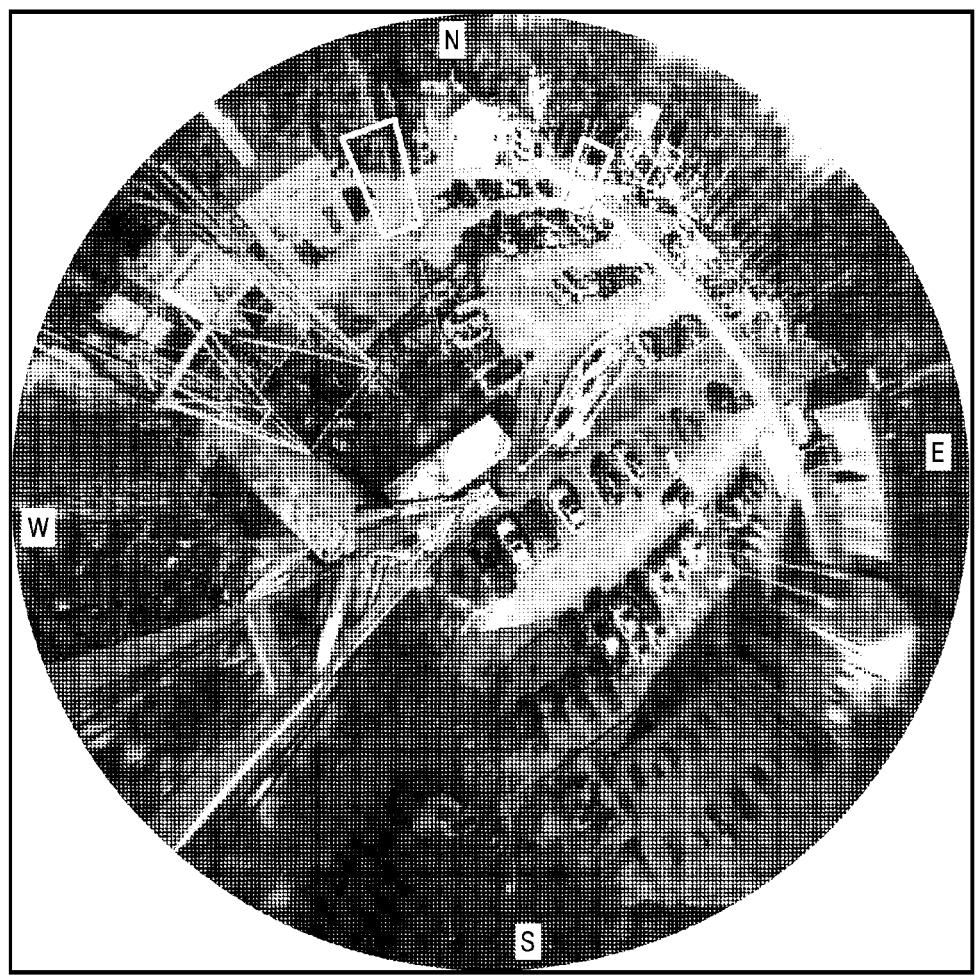
FIG. 15 shows a fisheye view that was acquired and corrected with an example ISIS system.

One problem with the fisheye view 1104 for wide-area surveillance is that object in the far field tend to concentrated along the "rim" of the picture, and the image is dominated by information from the near field in the center of them image. The ISIS system fixes this problem by reprojecting the imagery and "pinching" the imagery to the center, so that more detail is evident along the far field. This pinching is accomplished during projection by dividing the "z" component of the spherical (x, y, z) representation of the imagery by a scaling factor. By compressing the sphere in this way, the projection emphasizes the far field and makes the user better able to see activity in the far field, as shown in FIG. 15.

Activity Detection User Interface

Figure 12:
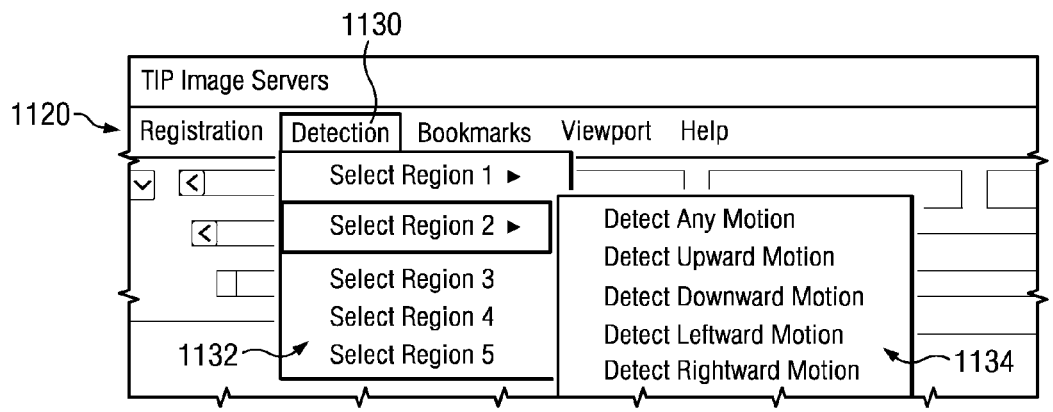

The user may configure the viewer 1100 to scan an angular region for activity, both on live data as well as stored data. The user can specify multiple such regions to watch simultaneously. The user specifies a single detection region by first using the "video" or right hand window to zoom into the area that will be watched. Then, as shown in FIG. 12, the user can choose a detection option 1130 in the main menu toolbar 1120, an index 1132 of the region that he/she wants to select, and then a direction of motion 1134 (e.g., upward, downward, leftward, rightward, any motion) that he/she wants to detect. Directional motion is determined based on the overall trajectory of the largest connected component in the binary detection image produced by the detection algorithm as described above.

After the user specifies the type of motion, the interface/client 108 prompts the user to specify the subregion within the field of view for which activity detection is desired. The user selects the subregion by drawing a box by depressing the right mouse button. Then the interface/client 108 breaks out a second window 1140 from the main window to show the selected subregion. In this way, the operator can visually monitor the detection region even as he/she uses the main video window to browse elsewhere in the image. The user may repeat this process to specify other regions to observe, and other windows will be broken out as well. At any time, the user may specify additional detection regions.

Once the ISIS system 100 has acquired enough data, the user can click a play button, causing the interface/client 108 to begin playing video through at the viewer 1100 and the ISIS video analytics engine 106 to process the data played back through the viewer 1100. If the user wants to play very quickly through the data, he can click on a "detection mode" checkbox which will cease all image requests and rendering for all imagery in the viewer except for the image regions corresponding to the selected detection areas, speeding up the performance of the viewer.

In the view 1100 shown in FIG. 11, the user has drawn a box 1108 around a particular sub-region with within the right-hand video window 1104. Another box 1106 has been drawn around a doorway in another region of the image. The specified regions 1106, 1108 are shown as different-colored boxes in the left-hand 360 degree context view 1102 as well, and a break-out box 1140 on the left hand side shows sub-region 1108 at all times regardless of what the viewer is looking at in the right-hand video window. (See also sub-region 1142 and corresponding break-out box 1144 in FIG. 13.)

The lines 1112 in the activity bar 1110 underneath the main time bar indicate periods of time where detected activity has occurred. The color of the lines correspond to the color of the box around the user-specified area to monitor. The user may jump to these time periods in one of two ways: 1) by clicking on the line below the time bar, or 2) by clicking on the buttons with arrows "Nxt Det" below the window. Clicking on the buttons will jump the user to the next or previous detection relative to the current time frame. By clicking these buttons, the user can very quickly scan through all of the detections present over a longer time epoch—for example, an hour—in just seconds. As the viewer is playing through video looking for detections, if the video analytics engine 106 determines that there is activity, then the window will flash red, alerting the user that activity is present at that moment in time.

Choosing Resolutions and Tiles During Viewing

When the interface/client 108 renders an image, it chooses the resolution at which the imagery is rendered, as well as the specific tiles from which the rendered image is created. Raw imagery from each imager is usually tiled into blocks, and then each tile is stored at multiple resolutions, with the dimension of the width and height halved at each successive resolution. For example, if the original tile is 128×128 pixels, the tile could be retrieved at a resolution of 128×128, 64×64, 32×32, 16×16, or 8×8. The tile and resolution that is chosen is based on the registration of the imagery done earlier in the calibration process.

For example, consider that the user wants to render a 512×512 view of scene at a particular point angle and angular field of view, (for example, a view centered at azimuth 190 degrees, elevation 44 degrees, field of view 6.3 degrees in both azimuth and elevation). The registration process 600 (FIG. 6) allows the viewer to map directly each pixel in the rendered image back to a specific pixel from the original imager. Thus, the user can determine exactly which tiles he/she wants to retrieve from the compressed imager. To optimize bandwidth usage and facilitate real-time playback, the user can choose the resolution level of the tile that most closely matches the resolution at which the tile will be rendered. For example, if the 128×128 tile of raw imagery is to be rendered to a region in the requested angular field of view at the desired 512×512 resolution that is approximately 15×15 pixels in size—and this is determined through the registration process, then the user can choose the 16×16 resolution level of the compressed tile and optimize bandwidth by a factor of approximately 64 times as compared to requesting the frame at the full resolution.

The resolution is chosen by determining which the nearest compressed resolution (128×128, 64×64, 32×32, 16×16, or 8×8) in a $\log_2$ sense. Thus, if the rendered image is N pixels wide, the viewer chooses a resolution with a $\log_2$ that is closest to log N. For example, if the width of the rendered region is 12 pixels, $\log_2 12=3.58$, $\log_2 16=4$, and $\log_2 8=3$, so the viewer would choose the 16×16 tile to render the imagery because 16 has the closest $\log_2$ value.

Examples of Stitched Imagery

Figure 14:
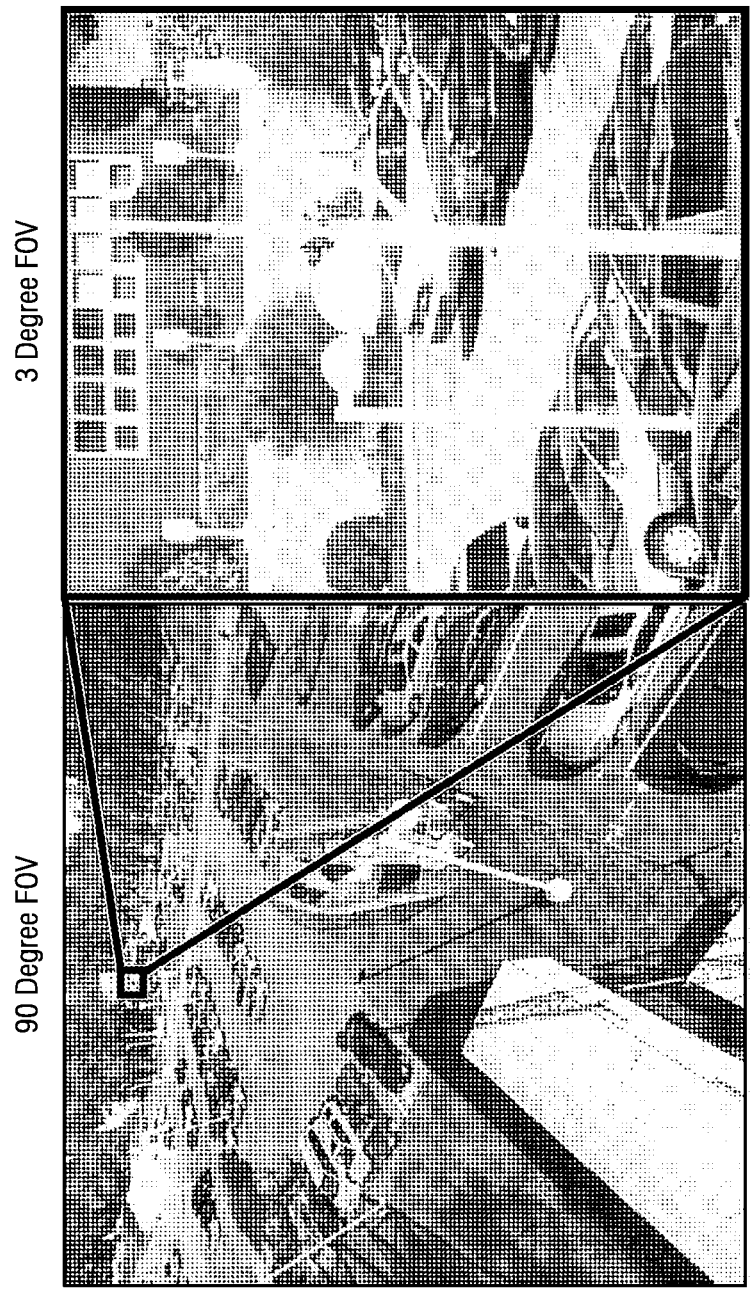
FIG. 14 shows rendered video views of 90-degree and 3-degree scenes acquired with an example ISIS system.

The imagery in FIG. 14 shows two rendered video views. The right hand view is rendered from several cameras to produce a single 90-degree view of the scene. To produce the image, the distortion of the lenses was removed, and the projection parameters for each camera was computed through registration. The right hand image shows a rendered 3-degree field of view, which shows the spatial resolution of imagery that is present throughout the entire scene, but not rendered unless needed.

Indoor and Outdoor Installation

The ISIS sensor 200 is appropriate for both indoor and outdoor installation. One example of an indoor installation is the mounting of the sensor to the ceiling of a large indoor public space like an airport terminal or train station, providing video coverage of the entire scene form a high vantage point. The sensor can also be mounted to the wall of an indoor space, providing hemispherical coverage of a room like a convention center. In an indoor basketball arena, the ISIS sensor can be mounted to the bottom of the scoreboard, either as a single sensor or several sub-sensors arranged around the edge of the scoreboard, providing coverage of the seats in the stadium as well as the basketball court itself.

Examples of outdoor installations points include a sensor mounted to a street-lamp or telephone pole overlooking a wide, open area of interest (like a city square, for example). Alternatively, the system can be attached to a mast for temporary emplacement or to the side of a building. Attaching the sensor to the corner of a building may maximize the azimuthal coverage of a wall or building-mounted sensor.

Mobile Surveillance Solution

The system, including sensor, storage/processing cluster, and viewer station may be packaged as a single mobile surveillance solution for either indoor or outdoor use. The system can be mounted on an adjustable, portable mast and adjusted to the desired height. The processing cluster and viewing stations can reside in a mobile truck or trailer, with power supplied by a generator or local power outlet. The fiber bundle can be run over the desired distance to the mobile trailer or truck. In this way, the mobile mast, truck/trailer, and generator form a mobile, high-resolution, wide-area surveillance solution that be taken from site to site as needed.

Processing Architecture

The processing architecture described above includes registration, rendering/warping, detection and tracking and the associated detection and tracking databases on the client-side processing chain. Each of these processing areas could also be performed on the server-side processing chain as well. For example, object detection could be performed on the data as it arrives from the camera, and before it is written to disk. Later, the client can request data from the detection database via the networked link. Likewise, some processing that occurs on the server side, such as color balancing, gain correction, and demosaicing, can be performed on the client side.

Processing in Hardware Versus Software

In the current implementation, many of the processing functions are implemented in software in languages like C and C++, whereas other processing functions, like image compression, are implemented on Application Specific Integrated Circuits (ASICs) or Field Programmable Gate Arrays (FPGAs). It should be noted that the ISIS architecture does not require that any particular part of the processing be performed in software or hardware. For example, image registration and rendering can be performed on graphics processing units (GPUs), and image demosaicing can be performed on an FPGA. Compression can be performed in software if desired.

Data Link Between the Server Cluster and Client PC

While the system described is a wired, gigabit ethernet link, the link between the server cluster and client PC may be any packet-switching based network, including wireless and wired links. A wireless link would make a physical connection between the client PCs and server cluster unnecessary, for example. Other links, for example, free space optical links, might also be used.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
  a first array of cameras, each of which has a first focal length and is disposed to image a respective portion of a wide area scene, the first array of cameras providing a first spatially continuous view of the wide area scene; and
  a second array of cameras operably coupled to the first array of cameras, each of which has a second focal length different from the first focal length and is disposed to image a respective portion of the wide area scene, the second array of cameras providing a second spatially continuous view of the wide area scene, wherein at least a portion of the first spatially continuous view of the wide area scene overlaps with the second spatially continuous view of the wide area scene, wherein the first array of cameras and the second array of cameras, taken together, are configured to provide a first image of a first target at a first distance in the wide area scene and to provide a second image of a second target at a second distance, different from the first distance, in the wide area, wherein the first image and the second image are at a substantially constant resolution, wherein the substantially constant resolution is about 1.5 centimeters or less.

2. The system of claim 1, wherein at least one of the first array of cameras or the second array of cameras is disposed along a curved plane.

3. The system of claim 1, wherein the first focal length is at least 1.5 times greater than the second focal length.

4. The system of claim 1, wherein the second distance is at least 1.5 times greater than the first distance.

5. The system of claim 1, further comprising:

memory, operably coupled to the first array of cameras and the second array of cameras, to store image data acquired by the first array of cameras and the second array of cameras; and a server, operably coupled to the memory, to serve the image data stored in the memory at a resolution up to and including the substantially constant resolution.

6. The system of claim 5 wherein the memory is configured to store the image data in an image format.

7. The system of claim 1, further comprising:

a fisheye camera configured to image the wide area scene; and a processor, operably coupled to the first array of cameras, the second array of cameras, and the fisheye camera, to register image data acquired by the first array of cameras and the second array of cameras based on data acquired by the fisheye camera.

8. The system of claim 1, further comprising:

a first module comprising at least one camera from the first array of cameras and/or the second array of cameras; and a second module comprising at least another camera from the first array of cameras and/or the second array of cameras, wherein the first module and the second module are communicatively coupled.

9. The system of claim 1, further comprising:

a wide-angle camera to provide reference imagery for image registration.

10. The system of claim 9, wherein the wide-angle camera is configured to image substantially all of the wide area scene.

11. The system of claim 9, wherein the wide-angle camera is configured to image a portion of the wide area scene, wherein the portion of the wide area scene has an angular field of view greater than 90 degrees.

12. The system of claim 9, wherein the first focal length is at least 1.5 times greater than the second focal length.

13. The system of claim 9, wherein each camera in the first array of cameras has a field of view that overlaps with a field of view of at least one other camera in the first array of cameras and with a field of view of at least one camera in the second array of cameras.

* * * * *